United States Patent [19]
Pryor et al.

[11] Patent Number: 4,739,414
[45] Date of Patent: Apr. 19, 1988

[54] LARGE AREA ARRAY OF THIN FILM PHOTOSENSITIVE ELEMENTS FOR IMAGE DETECTION

[75] Inventors: Roger W. Pryor, Bloomfield Hills; Stephen J. Hudgens, Southfield; Prem Nath, Rochester; Ronald G. Mulberger, Sterling Heights, all of Mich.

[73] Assignee: Ovonic Imaging Systems, Inc., Troy, Mich.

[21] Appl. No.: 885,988

[22] Filed: Jul. 15, 1986

[51] Int. Cl.$^4$ .............................................. H04N 1/04
[52] U.S. Cl. .................................. 358/285; 358/293; 358/294
[58] Field of Search ..................... 358/285, 293, 294; 250/573

[56] References Cited

U.S. PATENT DOCUMENTS 4,587,568 5/1986 Takayama et al. ................. 358/293

*Primary Examiner*—Edward L. Coles, Sr.
*Attorney, Agent, or Firm*—Marvin S. Siskind; Richard M. Goldman

[57] ABSTRACT

Apparatus for producing electronic signals which are representative of a detectable condition on an image-bearing surface. The apparatus includes an elongated array of distinct thin film photosensitive elements formed on a common flexible large area substrate. The elongated array of photosensitive elements are fabricated as a large area, photovoltaic structure formed of a plurality of thin film layers, including a first layer of thin film conductive material. The discrete photosensitive elements are defined by patterning of the conductive layer into shaped regions which determine the overall configuration and dimensions of each element.

10 Claims, 19 Drawing Sheets

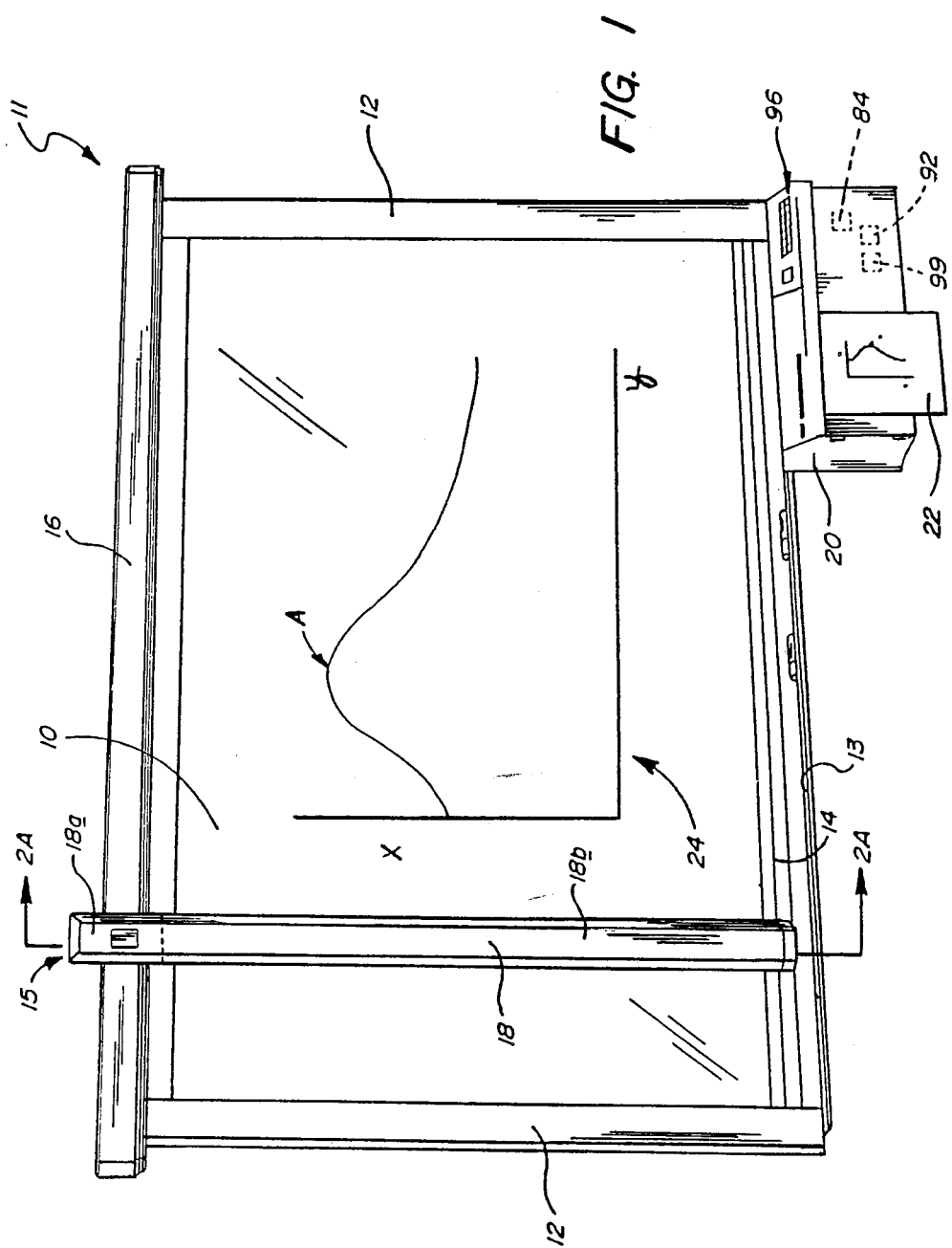

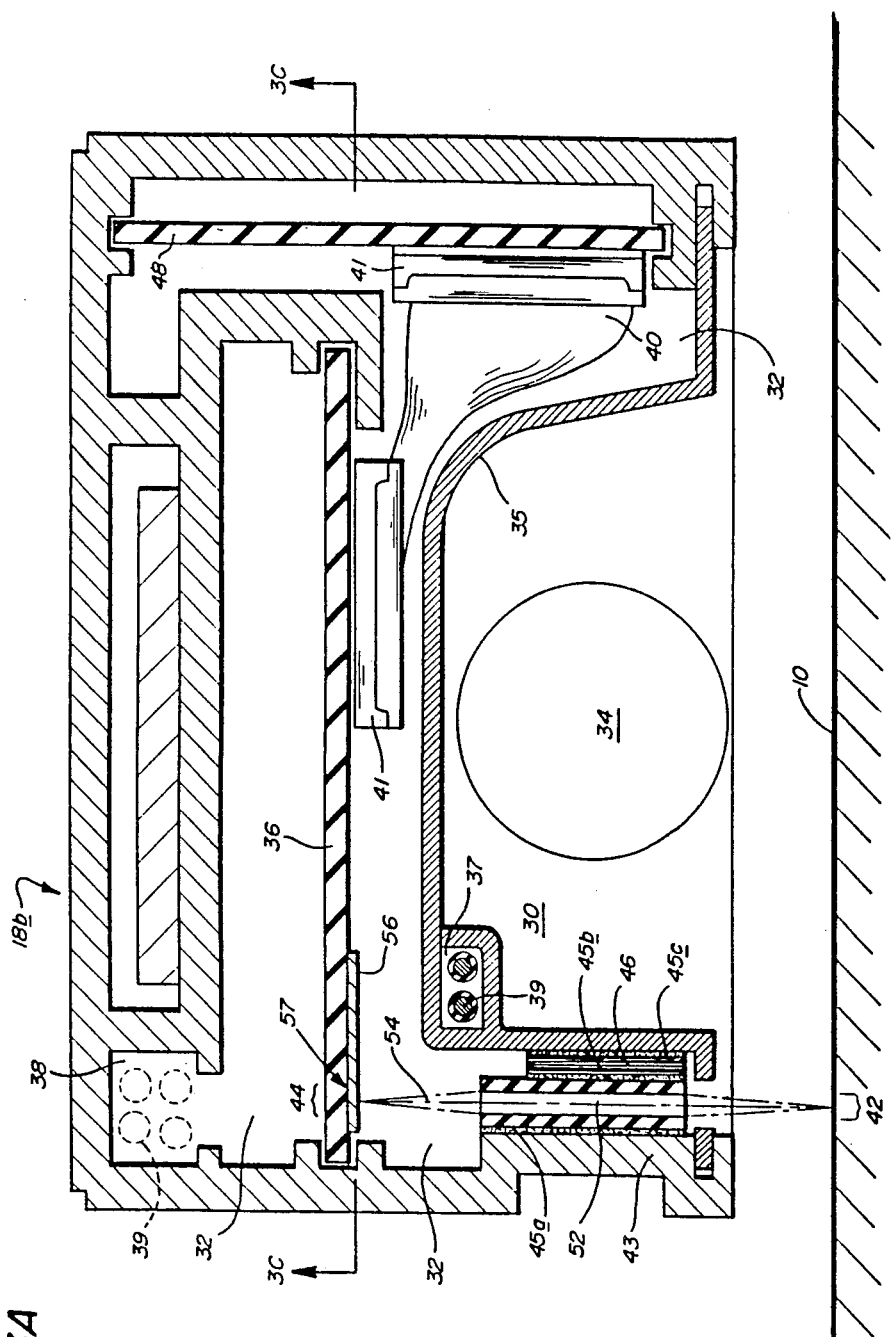

FIG. 3B
FIG. 3C
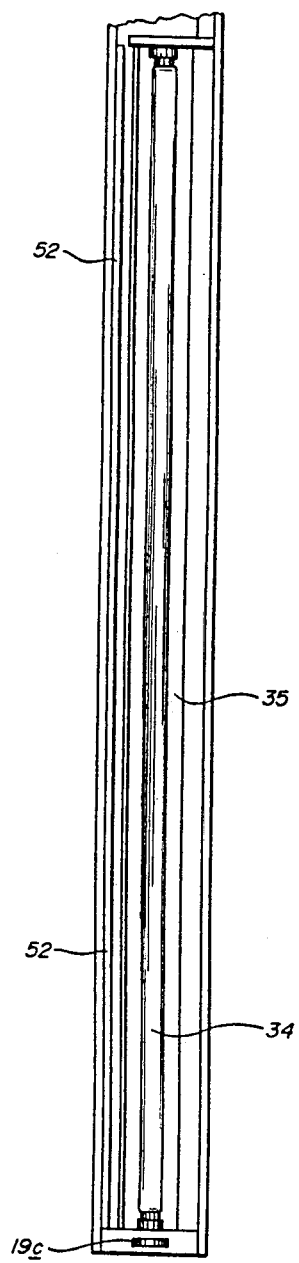
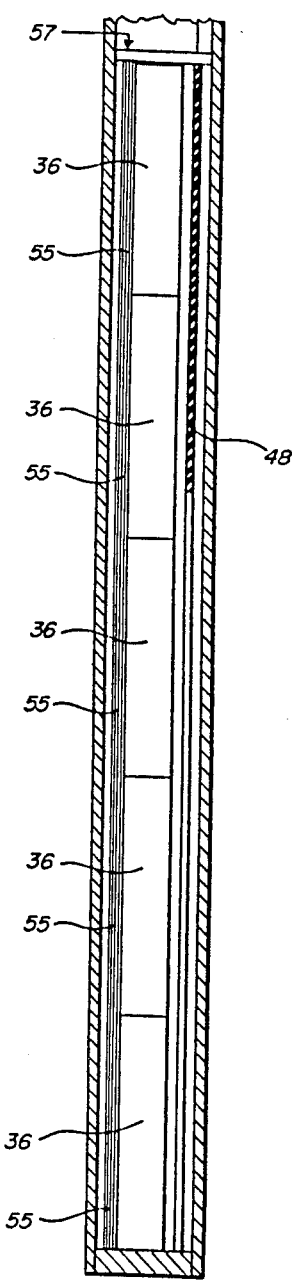

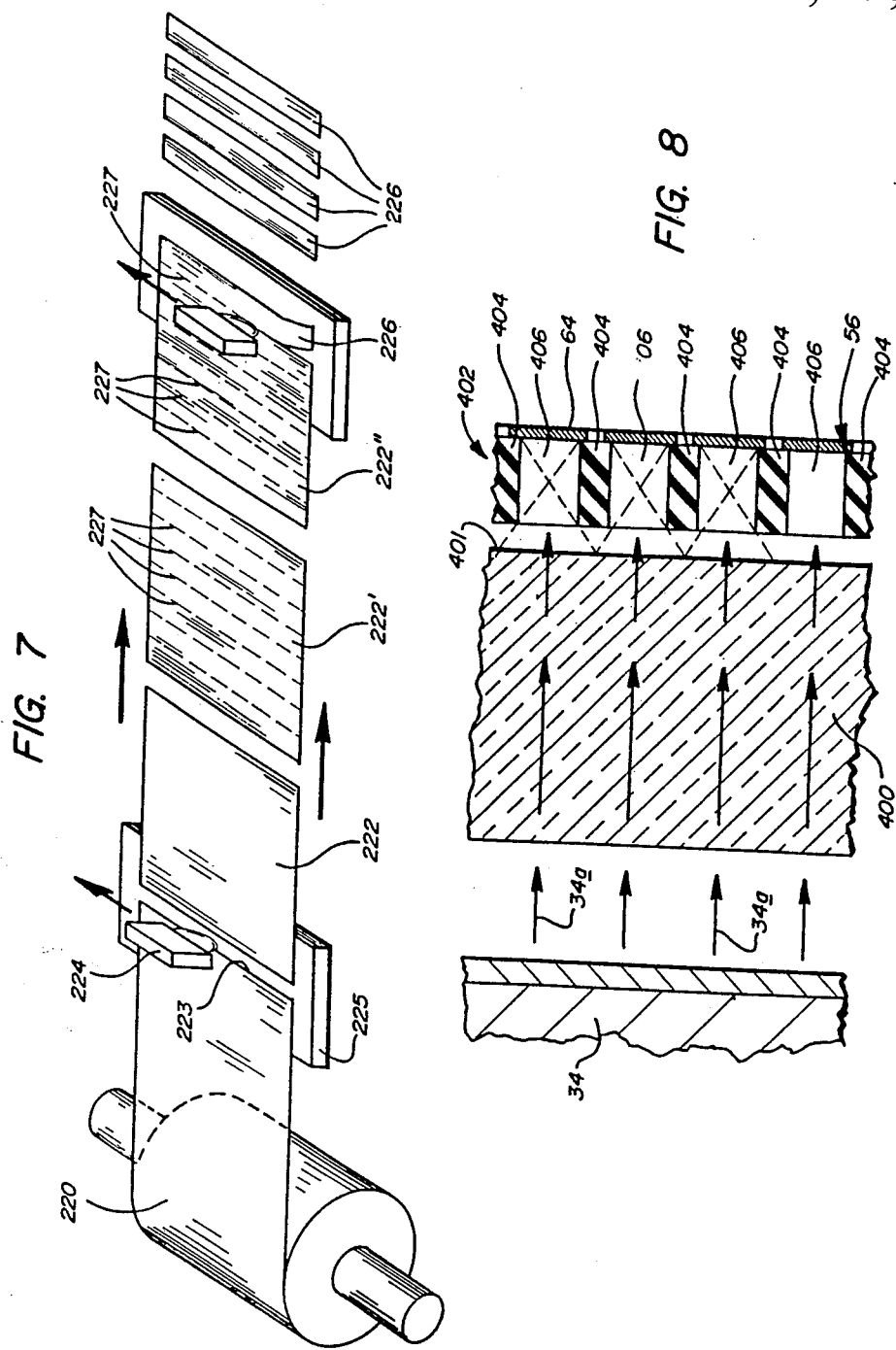

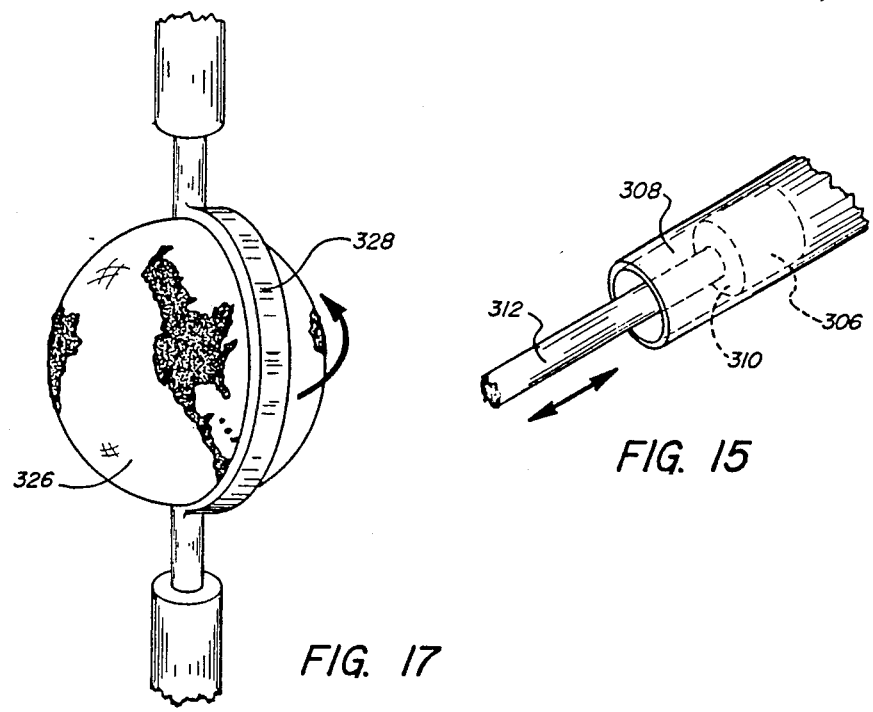
FIG. 15
FIG. 17
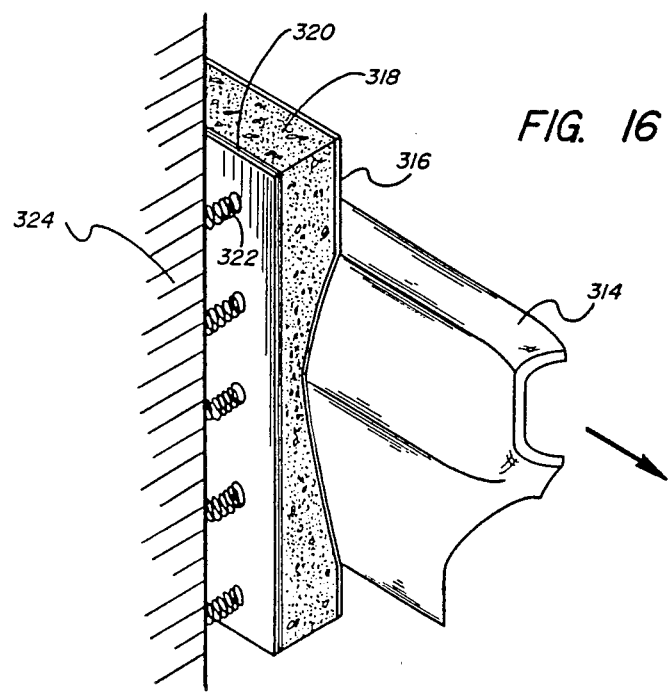
FIG. 16

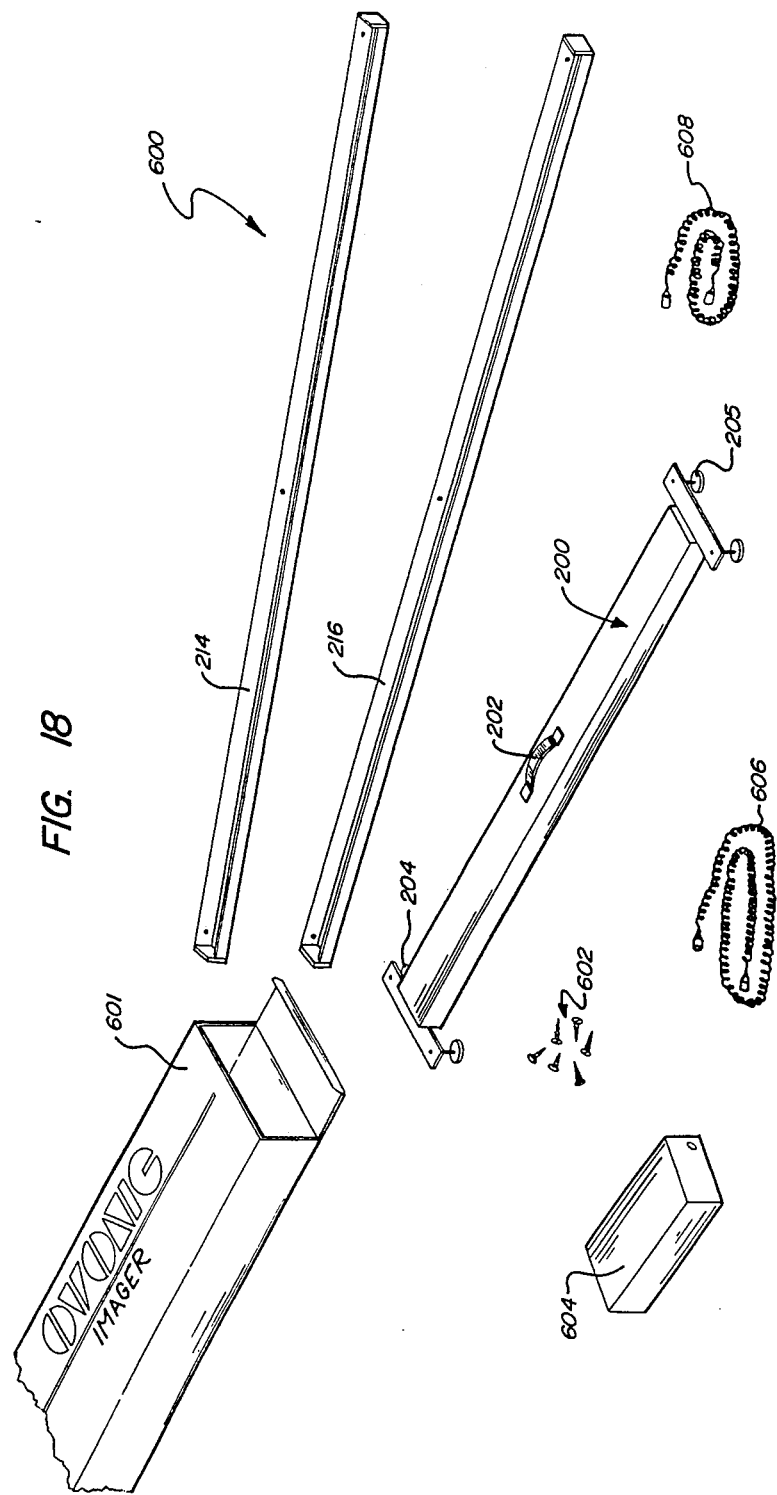

LARGE AREA ARRAY OF THIN FILM PHOTOSENSITIVE ELEMENTS FOR IMAGE DETECTION

FIELD OF THE INVENTION

This invention relates to an imaging system which uses an array of thin film semiconductor photosensors for producing electronic signals representative of the shape and color of an image on, or the visually detectable condition of a surface, such as a planar or contoured white-board surface. In one preferred embodiment, the instant invention relates to a line imaging system for electronic copy boards. As disclosed herein, such systems typically include an elongated linear array of thin film photosensitive elements, said array equal in length to one dimension of the surface to be scanned. In other embodiments, linear and two dimensional sensor arrays are utilized to scan non-planar, or other irregular surfaces. The imaging systems of the instant invention are adapted to produce binary or analog signals corresponding to the images on the surface being scanned, and include means for determining the appropriate threshold value used by each photosensitive element to discriminate between light and dark image points or portions by detecting the brightest point encountered by each element. Because the linear arrays of photosensitive elements of the instant invention are formed on a flexible substrate, the subject arrays can be specifically utilized to follow contoured surfaces or to assume irregular shapes and thereby scan surfaces not readable with the rigid arrays of the prior art.

BACKGROUND OF THE INVENTION

Electronic imaging or scanning systems are commonly used to transform an image from one form, such as a paper original, to an electronic form, such as a digital or analog signal. Once an image is converted to electronic form, many uses of that signal become are possible, including, without limitation, copying of the image onto a piece of paper, projection of the image onto a video display terminal, transmitting the image to a remote location, and subjecting the image to further image processing, such as by a computer, an optical pattern recognition device, or the like.

Line imaging systems typically include a linear array of photosensitive elements, such as photosensors, as well as a light source operatively disposed to provide flood illumination of the surface being scanned. Then either the image on that surface is moved in a direction perpendicular to the longitudinal axis of the sensor array, or the sensor array is moved in a direction perpendicular to the longitudinal axis of that surface so as to scan a stationary image. Since the light reflected from the image-bearing surface varies depending upon the portion of the image being scanned, a darker portion of the image will cause the photosensitive elements to receive less light, while a brighter portion will cause the photosensitive elements to receive more light.

In practice, it has been determined that, due to the inevitable variations in light intensity as well as the variations in the photoresponsive characteristics of individual elements, the signals produced by the reflection of light from areas of the image which are equally bright can be unequal.

It is known in the prior art to compensate for both photosensitive element and illumination non-uniformities of a particular linear array by calibrating the light output data of each element in response to a uniform background image. This accumulated data produces a calibration curve which may be stored in a memory (such as a RAM or a ROM) and then used to compensate the signals sensed elements of the array which combine to form the imaging system. However, because of photosensitive element and light output variability, the calibration curve for a Particular linear scanning array can change with time, thereby causing a degradation of the images produced and the need for constant recalibration.

Also known in the art is a scanning apparatus which is adapted to simultaneously sense both the light emanating directly from the source and the light reflected from the scanned image. For each photosensitive element in such an array, a value corresponding to the peak light intensity experienced in scanning the surface is stored; this peak value is then subtracted from the intensity of light previously measured and compared to the reference value. Based upon this comparison, the measured intensity is determined to correspond to either a bright image point or a dark image point. However, such systems are unnecessarily complicated, and require complex electronics.

It is also known in the art to scan surface areas as large as a one meter by two meter copy board by having a movable, white flexible material such as Polyester, stretched across and in front of a correspondingly large rigid surface. An image, such as characters or graphics are drawn or otherwise formed upon the surface of the flexible material using, for example black or dark colored erasable markers. Spaced rollers operatively disposed on either distal side of the copyboard are driven in synchronism by a pair of microprocessor controlled stepping motors so as to roll the flexible sheet onto one of the rollers. The image in such systems is scanned under the supervision of a microprocessor control by an array of one or more integrated CCD sensors positioned at a distance of about one meter from the take-up roller. A light source positioned adjacent to the take-up roller and an optical lens system positioned between the take-up roller and CCD array cooperate to pr ject the image onto the CCD. In this manner, a CCD device which may be 25 millimeters or less in linear dimension is capable of scanning the entire surface of the flexible material as the material is being scrolled. Once digitized into electronic form, the image is sent by the microprocessor to a printer which then provides a hard copy of the scanned image. That hard copy generally has been greatly reduced in size compared to the original on the copyboard surface. Such systems typically exhibit fairly low resolution, on the order of 1.0 to 1.5 photosensors or pixels per millimeter or less of original copy, since higher resolution is normally not required for making reduced size copies.

Since the CCD photosensor array and lens system must be spaced relatively far from the linear strip of the image being scanned in order to allow light from the the strip to be focused down to the size of the photosensor array, such systems are quite bulky (the copyboard must be thick enough to contain the optical elements). For the same reason, it would not be possible to mount the optical system and CCD sensor array on an elongated movable arm which moves across the stationary image-bearing surface to be copied. Also, since CCDs are quite expensive, it is uneconomical to provide a multitude of integrated CCD photosensitive elements (said photosensitive elements having about two orders of magnitude more resolution than needed) arranged in a large linear array on a movable arm in order to scan a large area image on a stationary board surface to produce a low resolution copy.

In light of the foregoing, it will be readily appreciated that there remains a need for an imaging system which includes a low cost linear array of photosensitive elements, which elements span an elongated linear distance such as one-half meter to one meter or more and which system can be utilized to scan and digitize images on large light-colored surfaces having one or more square meters of surface area. Furthermore, there remains a need for an imaging system including such a linear photosensitive array which provides for such large image-bearing surfaces to be scanned quickly, efficiently, reliably and in a manner which automatically compensates for variations in image tone, differing individual photoresponsive element characteristics, and changing illumination conditions, such as from the aging (and hence deterioration) of the flood illumination light source.

There also remains a need for a large, low cost linear photosensitive array which features excellent signal-to-noise ratios and the ability to detect relatively light colors (such as low contrast red, light green and light blue) on a white or light colored background surface; as well as darker colors, such as black, brown, dark blue and dark red, on such a light colored background surface.

A further novel feature of the subject invention, which feature finds no response in any prior art, is the fabrication of the linear photoresponsive array on a flexible substrate. In this manner, the flexible photoresponsive array can be used in ways heretofore impossible so as to scan images and conditions on contoured surfaces.

It is desirable, therefore, to provide a simple, inexpensive line imaging system which is capable of compensation, on a substantially instantaneous basis, for variability and changes in illumination intensity as well as instability of photoresponsive element response.

These and many other advantages of the subject invention will become apparent from the drawings, the detailed description and the claims which follow.

BRIEF SUMMARY OF THE INVENTION

Disclosed herein is line imaging apparatus adapted to scan and collect Data from an image-bearing surface. The imaging apparatus then produces electronically detectable signals which are representative of the detectable surface conditions. The apparatus includes an elongated, large area array of distinct thin film noncrystalline photosensitive elements formed of thin layers of semiconductor material. The array includes one or more elongated groups of said photosensitive elements, each group formed on a common or discrete flexible large area substrate. The elongated groups of photosensitive elements are substantially similar in size and configuration and may be arranged in end-to-end or in side-to-side relationship. In one preferred exemplification, there are four or more elongated groups of photosensitive elements operatively disposed in a common plane and arrayed in end-to-end relationship. The individual photosensitive elements are defined by patterning the layer of upper conductive electrode material into shaped regions which determine the surface area of each photosensitive element.

The flexible substrate may be a thin strip or web of a highly conductive material, such as stainless steel. Alternatively, the flexible substrate may be formed as a laminate of an insulating material, such as an organic polymer, with a thin film of highly conductive material thereon. When the substrate is a laminate, it may be either transparent or transluscent with the thin film of highly conductive material being substantially transparent or transluscent, such as an oxide of one or more of indium, tin, zinc, cadmium or zirconium on a conductive metal such as molybdenum or chromium. The conductive material of the common flexible substrate serves as a large area common electrode to each of the individual photosensitive elements. Optionally, there may be a thin film of reflective material interposed between the substrate and the semiconductor material from which the elements are fabricated. There further may be a linear array of apertures corresponding to and registering with the linear array of photosensitive elements to limit the light energy incident on the elements to substantially that light energy emanating from the corresponding portions of the data bearing surface.

The individually shaped regions of the array, that is the individual photosensitive elements, are defined by patterning the conductive layer so as to determine the surface area and boundary of each element. Each individually shaped region includes a photosensor portion adapted for receiving illumination and a contact pad portion adapted for receiving a discrete electrical connection so that a discrete electrical signal can be transmitted by each photosensitive element.

Preferably the photosensor portion and the contact pad portion of each individual photosensitive element are electrically interconnected by a trace portion which is significantly narrower than the contact pad portion. In this manner, the combined area of the contact pad portion of each individual element and the trace portion of each individual element provide added capacitance of a predetermined magnitude in parallel with the inherent capacitance attributable to the photosensor portion of each individual element.

The elongated array may include an opaque covering over the trace and contact pad portions of each individually shaped region. This prevents light from illuminating the trace and contact pad portions of the array. Typically each elongated group is about two inches long and includes about 50 aligned photosensitive elements, although the elongated group may be longer or shorter and have more or fewer aligned elements. The individual photosensitive elements are operatively disposed in a single row or in parallel rows.

The thin film layers forming each individual photosensitive element include first, second, and third layers of amorphous semiconductor material, e.g., amorphous silicon or germanium alloys, serially arranged to form a first PIN diode which defines a photovoltaic structure. In a preferred exemplification, the thin film photovoltaic structure includes fourth, fifth, and sixth serially arranged thin film layers contiguous to the first, second, and third thin film layers, so as to form a second PIN diode directly below the first PIN diode so as to define a tandem photovoltaic structure. The amorphous silicon or germanium alloys preferably include at least one density of states reducing element, e.g., one or both of fluorine and hydrogen.

The photosensitive elements are operable to integrate the total amount of incident light over a predetermined period of time by functioning either to (1) change an uncharged element with photogenerated current and measuring the resultant change in voltage or current or (2) discharge a stored charge previously imposed on the element with photogenerated current and measuring the resultant change in voltage or current.

The data to be scanned may be carried on a light transmitting surface, with a light source mounted on the back side of the surface, i.e., the side remote from the photosensitive array, for back lighting the data during scanning. Alternatively, the data to be scanned may be carried on a light reflecting surface in which case the light source may be positioned on the same side of the surface as the photosensitive array. The photosensitive array and the image-bearing surface are moveable with respect to each other. When the array is movable with respect to the image-bearing surface, means are provided to allow for the transverse movement thereof, e.g., rollers or a trace pair. When the image-bearing surface is movable, the surface is preferably flexible and means are provided for paying out and taking up the surface, e.g., rollers. The photosensitive array is fabricated by providing a large area substrate of stainless steel, glass, or a polymeric resin. In the case of a polymeric substrate, an initial electrically conductive thin film layer is applied to the substrate.

Layers of semiconductor material and conductive material are then applied atop the continuous web to form a large area photosensitive element. The photosensitive element is then patterned to define at least a first group of discrete small area photosensitive elements arranged in a predetermined configuration to form the array.

After deposition and patterning, the web carrying the individual photosensitive elements is severed into a plurality of individual arrays, thereby providing the fabrication of multiple arrays of photosensitive elements from one large area substrate.

BRIEF DESCRIPTION OF THE DRAWINGS

FIG. 1 is a perspective view of one embodiment of the linear imaging system of the present invention illustrating the use of said system in combination with an electronic copy board;

FIG. 3A is an enlarged cross-sectional view of the sensing arm of the imaging system of FIG. 1 taken along lines 3A—3A of FIG. 2A illustrating one embodiment of an optical and illumination system; FIG. 3B is a side plan view of the sensing arm shown in FIG. 2A, as seen from the board surface and showing the light source and lens position; FIG. 3C is a cross-sectional side view of the sensing arm taken along lines 3C—3C of FIG. 3A showing the relative positions of six printed circuit boards within the arm;

FIG. 7 is a perspective illustration of a preferred method of manufacturing the linear strips and arrays of photosensitive elements shown in FIGS. 5;

FIG. 8 is an enlarged fragmentary cross-sectional side view of one embodiment of a lensless imaging system formed with a linear array of photoresponsive elements adapted for receiving illumination provided by a back-lit translucent board;

FIG. 15 is a perspective view of a flexible scanner array of the photosensitive elements of the instant invention as that array is operatively disposed to image or inspect the interior surface of a cylindrical pipe.

FIG. 16 is a perspective, cut-away view of a flexible scanner array of the photosensitive elements of the instant invention as that array is operatively disposed to image or inspect an irregular surface, such as the surface for automobile body panel.

FIG. 17 is a perspective, cut-away view of a flexible scanner array of the photosensitive elements of the instant invention as that array is operatively disposed to image or inspect the surface of a sphere.

FIG. 18 is a perspective view of the components of the retrofit imaging kit of the instant invention.

DETAILED DESCRIPTION OF THE PREFERRED EMBODIMENTS

Figure 2A:
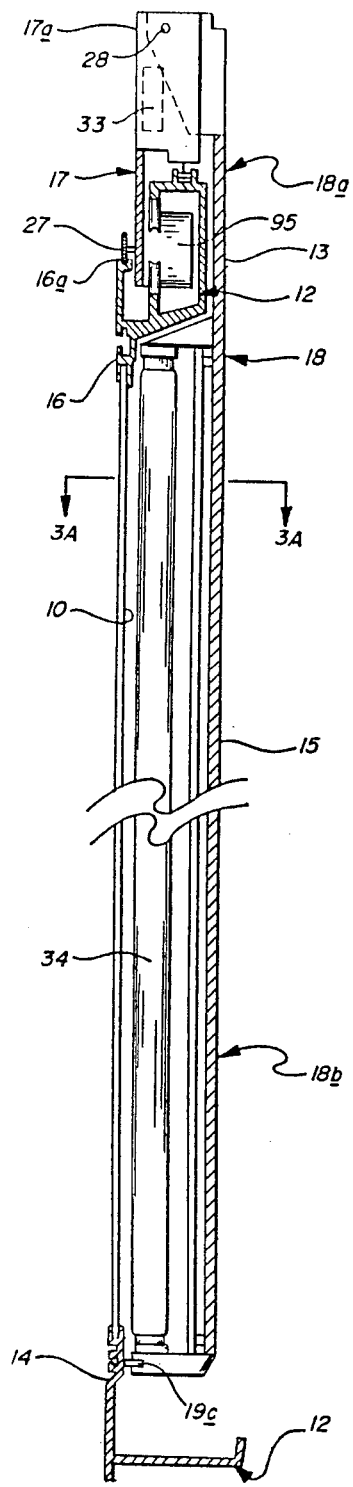
FIG. 2A is a cross-sectional side view of the copy board and sensing arm of the imaging system of the subject invention taken along lines 2A—2A of FIG. 1.

FIG. 1 illustrates one embodiment of the linear imaging system 15 of the present invention as that system 15 is incorporated into and forms a large area imager for an electronic copy board 16 which includes electronic controlling circuitry and a printer 20. The electronic copy board 11 is sized and Configured so as to include a large background surface 10 which is white or of a substantially uniform, Preferably light color. The surface 10 is preferably formed of porcelain baked on sheet steel, and may take the form of a white marker board designed for use with erasable, greaseless, colored, felt-tipped marking pens. Such copy boards and marker pens are sold by Quartet Manufacturing Company of Chicago, Ill., among others. Alternatively, a large, relatively smooth, light-colored sheet of paper, piece of cardboard or polyester cloth fastened to a rigid board, table or wall could be utilized as a background surface 10 capable of being image-bearing and being scanned by the linear imaging system of the subject invention.

High resolution embodiments of the line imaging system 15 could be used, for example, on a drafting table in order to digitize manually prepared line drawings and blueprints for input into computer-aided design systems and the like. "High resolution" in this context generally means a sensor density in excess of two photosensitive elements per millimeter, and preferably in the range of four to sixteen photosensors per millimeter. Other embodiments of the subject line imaging system 15, having either high or low resolution as needed, could be used in industrial imaging applications. Such applications may include, by way of example and not limitation, inspection of the surface contour of parts or material such as planar sheets of metal, plaster board, plywood, or continuous webs of thin flat sheet metal stock, fabric or paper, for flaws or defects. The length of the linear array of photosensitive elements, as developed by the subject inventors, can be precisely tailored to suit any of such applications (from several millimeters to several meters in length).

While the following discussion is specifically directed toward the most preferred embodiment of the subject imaging system, as that system is particularly configured and designed to operate with a white or light colored background surface 10 upon which there are created contrasting images, possibly made from black lines or other dark-colored lines, those of even rudimentary skill in the art, after reading the enabling disclosure which follows, will readily be able to adapt this line imaging system to other applications such as those mentioned above. For example, the imaging system 15 can be used with a background surface of virtually any color, including green or black, provided that (1) the symbols or graphics to be scanned (or flaws or defects to be detected) are of a contrasting color, and (2) the signal processing be designed to accommodate the colors of the background and symbols or graphics (or flaws or defects) to be scanned. Further, those skilled in the art will appreciate that it is a simple matter to "reverse" the electronic image so that lines or symbols written on the original in light letters on a dark background may be transmitted and printed as though they were dark points, lines or symbols written on a light background.

As alluded to hereinabove, the instant invention makes it possible for the first time that the portion of surface 10 to be scanned may be of any size, shape or contour. For example, the scannable Portion of the rectangularly-shaped copy board surface 10 to be imaged typically has a horizontal dimension of 66 inches (167.6 cm) and a vertical dimension of 44 inches (117.8 cm) or of 33 inches (83.3 cm). A rectangular frame 12 preferably surrounds and supports the perimeter of the surface 10 and can, for example, facilitate mounting surface 10 on a convenient support, such as a wall. The frame 12 may further include a trough or tray 13 for holding small articles, such as erasers and the aforementioned markers. With the foregoing general design parameters in mind, the component elements of the large area copy board which forms the preferred embodiment of the subject invention will be discussed in detail in the subsections which follow.

A. THE IMAGING SYSTEM AND MOUNTINGS

The imaging system 15 includes a relatively thin elongated arm 18, which is preferably comprised of upper and lower housing portions 18a and 18b, respectively, which may be made of any suitable material such as extruded anodized aluminum, formed steel sheet or injection molded plastic. The lower housing portion 18b preferably spans the entire vertical distance between upper frame member 16 and lower frame member 14, and contains a light source for illumination, and a linear array of photosensor elements (also referred to interchangeably as image sensors). Arm 18 also may, and preferably does, house the electronics for conditioning signals produced by the imaging system 15, and for comparing the signals against threshold values to determine whether each signal represents a low level or dark image condition or a high level or light image condition. Also, a linear lens structure may be included within or underneath the arm 18 in lower housing portion 18b.

Figure 2B:
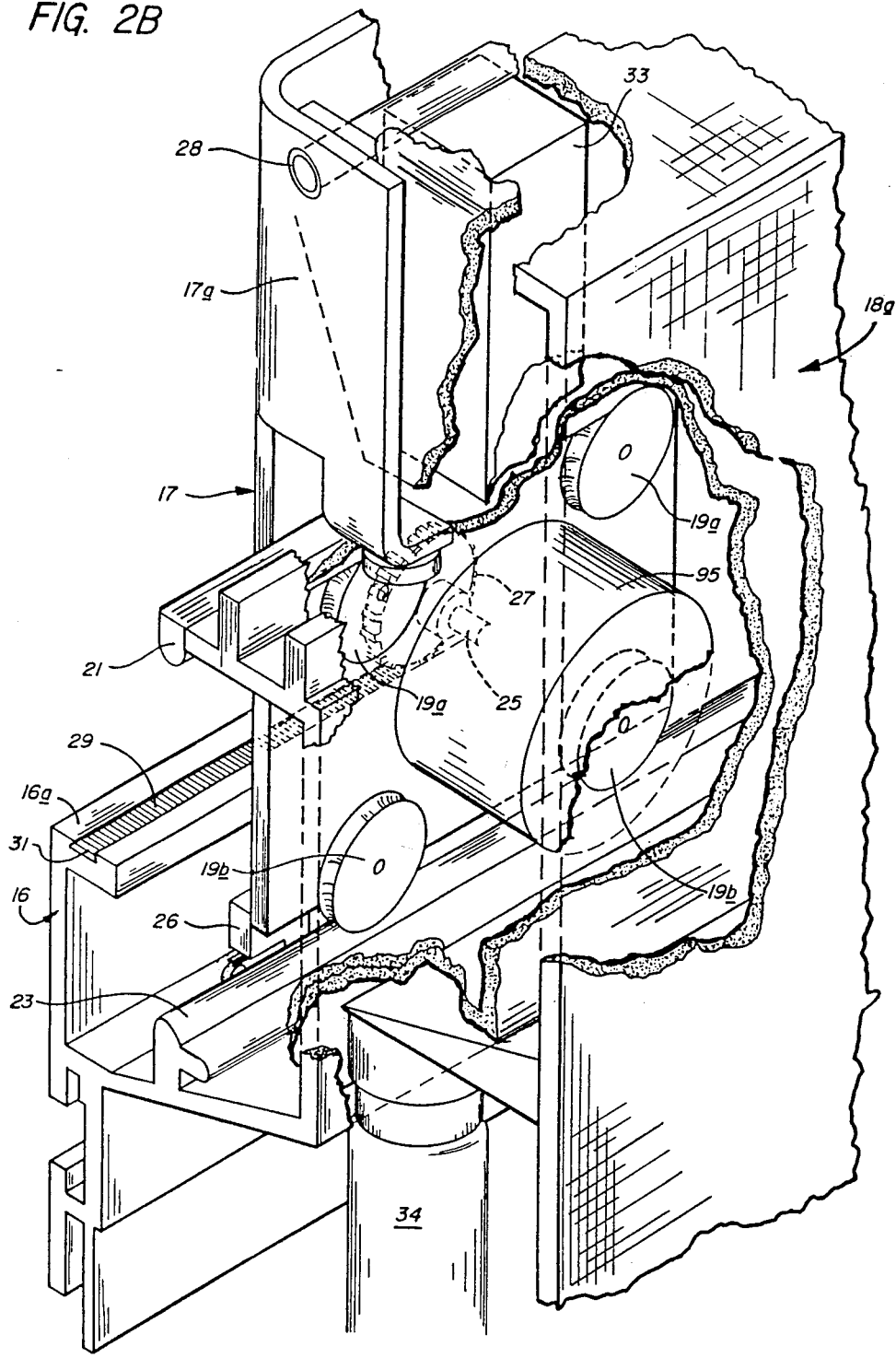
FIG. 2B is a cut-away perspective view of the upper portion of the sensing arm of FIG. 2A showing a multiple wheel trolley and rack-and-pinion drive.

Referring now to FIG. 2A and 2B, the upper housing portion 18a of arm 18 and part of upper frame member 16 are shown in an enlarged cut-away perspective view. Upper housing portion 18a of arm 18 is attached to and supported by a trolley 17 having four wheels 19, which transfer substantially all of the weight of arm 18 to the upper frame member 16. An upper pair of spaced apart wheels 19a bear against and partially envelop an upper track 21, and a lower pair of spaced apart wheels 19b bear against and partially envelop a lower track 23. The tracks 21 and 23 are preferably rounded or otherwise shaped to rollably engage or mate with the complementarily shaped wheels 19. This four-wheeled trolley arrangement serves to prevent jitter or horizontal oscillatory swaying of the arm 18 as it moves across the image-bearing surface 10. In an alternate and preferred embodiment, the trolley 17, may include one or more wheels engagingly contacting the track on the opposite side of rib 21a from the opposite side of wheels 19a so as to still further decrease jitter or swaying. Trolley 17 also preferably includes a drive motor 95 having an axle 25 upon which is mounted a pinion gear 27 that engages a stationary rack attached to or formed on an adjacent surface 16a of upper frame 16. Drive motor 95 could be any suitable motor such as a synchronous two phase or polyphase motor, but is preferably a conventional stepper motor for very uniform speed and precise positioning control.

The rack is preferably formed by a chain 29 that is snugly laid into a groove 31 in the upper frame member 16. The chain 29 may be rigidly positioned by a press fit into the groove, which Preferably has a trapezoidal cross-section as shown, or a rectangular cross-section. Alternatively, the chain 19 may be fixed in position by anchoring it at both ends into upper frame member 16 with suitable anchoring means such as pins, screws or other conventional fasteners. The chain 29 can be any suitable chain, but preferably is a stainless steel cable reinforced polyurethane link chain made by Flex-E-Gear Co. For example, a suitable drive chain 29 can be made from a length of Flex-E-Gear 24GCF series chain. The sprocket gear 27 can be a Flex-E-Gear 24B4 series gear, such as Catalog No. 24B4-18. These Flex-E-Gear components are available from Winfred M. Berg, Inc. of East Rockaway, N.Y. As a substitute for a chain, a suitable metal or high strength plastic strip upon which is formed a rack to rollably engage the movable sprocket gear 17 could be positioned snugly in groove 31 or otherwise stationarily anchored in proper position on upper frame 16. Obviously, other drive systems such as a friction drive or cable drive may also be utilized; similarly other arrangements of the track and wheels can be utilized.

The direction of rotation of motor 95 can be reversed, thereby allowing arm 18 to be driven from left to right or from right to left. The electronics for the imaging system 15 allows the linear photosensor array in the arm 18 to be scanned from top to bottom or from bottom to top, as desired. The scanning operation may be started from either the left edge or right edge of the frame 12, so that the image-bearing surface 10 can be scanned left to right or right to left. If only a portion of the surface 10 is to be scanned, the user may, by operating selected control buttons, to be described later, position the arm 18 as desired anywhere along surface 10, and commence scanning there.

Arm 18 is uniformly spaced a predetermined distance away from surface 10. Anchored to the lower end of arm 18 is a roller 19c (shown in FIG. 2A), which is provided to maintain this uniform spaced relationship, and to assist in allowing arm 18 to be moved smoothly across the board. Additional components such as inverter ballast 33, which is electrically connected to and powers the fluorescent tube 34 may be included within the arm 18, if desired. As shown in FIGS. 2A and 2B, the upper arm housing 18a may extend above the trolley to provide room for mounting the ballast there. The ballast 33 preferably operates at a high frequency above 20 kilohertz.

FIGS. 2A and 2B show a preferred construction of a hinge 28 located at the top plate 17a, which extends vertically above the main portion of the trolley frame. The hinge 28 pivotally connects the trolley 17 to the upper arm portion 18a. This pivoting arrangement provides easy access to the face of arm 18 closest to the board surface 10 without disassemblying any part of the arm. The arm is thus free to swing outwardly away from the board surface 10. This makes changing the fluorescent light 34, or cleaning of the external surface of the lens array (described hereinafter) much easier.

FIG. 3A shows a cross section of arm 18 near the top of lower arm portion 18b as indicated in FIG. 2A. Arm 18 is held in uniformly spaced relation to the surface 10 and includes two chambers, light chamber 30 and photosensor chamber 32. Light chamber 30 is defined by a thin walled U-shaped member 35 extending the full vertical length of lower arm portion 18b as shown in FIG. 2A. The open side of the U-shaped chamber 30 faces surface 10 and contains a suitable linearly arranged light source such as a bank of closely spaced LEDs arranged in a long row (not shown) or preferably a fluorescent tube 34. It is generally preferred that the fluorescent tube 34 is operated at a relatively high frequency such as 20 to 25 kilohertz so that any flickering of its output is at substantially higher rate than the sampling rate of the photosensors to be described below and any sound generated by transformers in the ballast from magnetostructure or other effects is above the range audible to the human ear. Such operation requires a high frequency ballast, such as ballast No. 24RS40E available from the Bodine Company of Collierville, Tenn. The fluorescent tube 34 may, for example, be a Sylvania bulb Catalog No. F032/41K, which is four feet long and produces light having a color temperature of about 4100 degrees Kelvin when used in conjunction with the Bodine ballast. The walls of chamber 30 facing the tube 34 are opaque and preferably have a white diffuse surface.

A-1. THE P.C. BOARDS AND CONNECTIONS THERETO

The photosensor chamber 32 houses a number of identical printed circuit (PC) boards 36. A linear photosensor array 55, which preferably has 256 individual photosensitive elements arranged in a line, is mounted on each PC board 36. The array 55 may in practice be comprised of a plurality of photosensor strips 56, placed in end-to-end abutment, and each strip 56 preferably contains the same fraction of the total number of individual photosensors in array 55, such as 64 photosensors. The PC boards 36 are placed in end-to-end abutment as illustrated in FIG. 3C, so as to effectively form a single long PC board, and the linear photosensor arrays 55 of PC boards 36 are thus aligned and form a single long photosensor array 57, which vertically spans the readable portion of board surface 10 between upper and lower frame members 14 and 16 shown in FIG. 1. The number of PC boards 36 may be varied, depending upon the length of each PC board 36, and upon the length of the lower arm portion 18b which corresponds to the vertical distance on surface 10 to be scanned. A single very long PC board which may contain continuous (i.e., unsegmented) integrated photosensor array 57 could be used, if desired for this purpose. It is presently more economical, however, to use multiple PC boards 36 and multiple sensor arrays 55 arranged as just described.

For example, in one embodiment, adapted to scan a 44 inch long vertical surface, five PC boards 36 having 256 individual photosensitive elements each are used. In a second embodiment of the imaging system four PC boards each having 320 individual photosensitive elements may be used. In both of these embodiments, there is a total of 1280 individual photosensitive elements in the overall photosensor array 57. The number of said elements is selected to correspond to the number of elements in the thermal head of the printer 20. These two foregoing embodiments are particularly well suited for use as low resolution scanners such as those used for making reduced size copies from a whiteboard. A lesser or greater number of photosensitive elements could clearly be used in sensor array 57, depending on the length to be scanned, resolution requirements and the like.

Referring back to FIG. 3A, the lower housing portion 18b may also be provided with substantially or fully enclosed conduits 37 and 38 adapted to carry power wires 39 used to provide the high frequency high voltage A.C. power required to operate the lamp 34. The walls of the conduits 37 and 38 are preferably made of metal or other material which blocks electromagnetic radiation. The two wires 39 in conduit 37 supply power to the lamp 34. Placing the power wires 39 in these conduits helps to shield the PC boards 36 from other onboard electronics and wire cabling interconnecting them, from electromagnetic radiation, particularly harmonics of the basic A.C. frequency used with the lamp 34. The interconnections between PC boards 36 and other electronic elements is preferably made by techniques and utilizing hardware known and available to those skilled in the art.

The light incident on each photosensitive element of array 57 is converted into usable electrical signals through the use of electronic circuitry which is preferably located on PC board 36 in reasonably close proximity to the individual sensors. Signals produced by circuitry on PC boards 36 are transmitted to circuitry on another board, for example PC board 48, for further processing to be described later. Signals produced on PC board 48 are then transmitted to the printer or other downstream components located remotely from arm 18.

As can be seen with reference to FIG. 3C, a longitudinal cut-away view of the lower portion 18b of one embodiment of the arm 18 shown in FIG. 2A, five individual PC boards 36 are combined in edge-to-edge abutment so as to effectively create the elongated PC board supporting a photosensor array 57. The linear photosensor array 55 attached to each PC board 36 can be created from one or more photosensor strips, each having a smaller number of individual photosensitive elements.

Figure 4A:
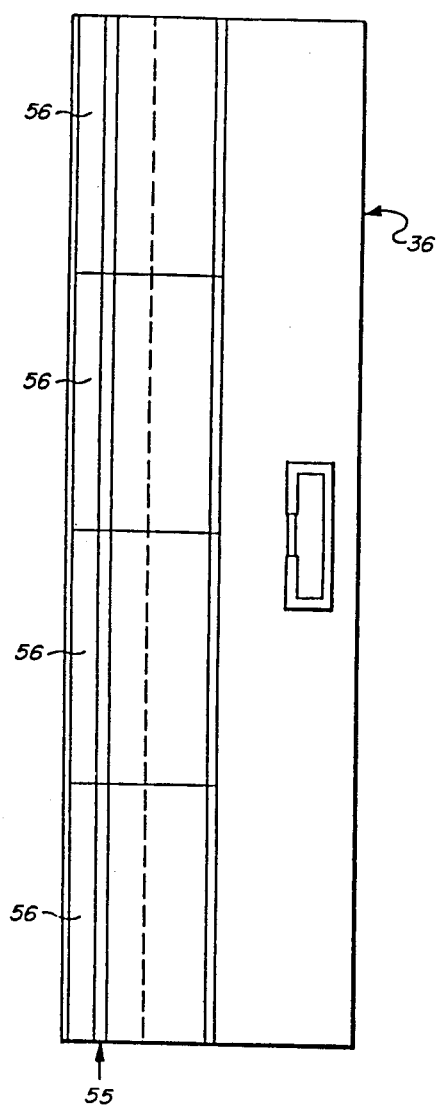
FIG. 4A is a top plan view of one of the five photo-sensor-carrying printed circuit boards, the positions of which are shown in FIG. 3C.
Figure 4B:
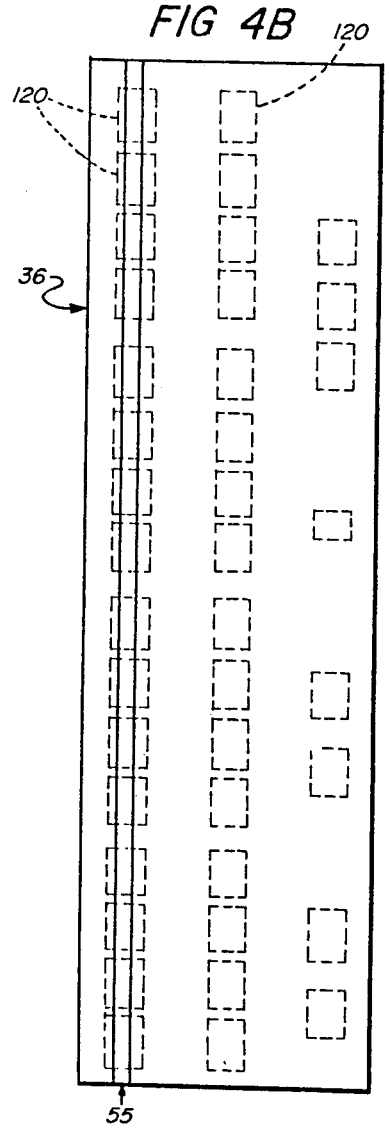
FIG. 4B is a top plan view of the printed circuit boards as in FIG. 4A with the surface mounting elements shown in phantom.

In order to conserve PC board space and thereby minimize the cross-sectional area of the arm 18, the electronic circuitry may be mounted on the side of PC board 36 opposite the photosensor strips 56, and preferably comprises surface mount technology (SMT) components, which are further described by manufacturer and part number hereinafter. SMT devices permit greater densities to be achieved on PC boards than is possible with the older dual-in-line packaged integrated circuits. The rectangles shown in dashed lines in FIG. 4B, indicate the relative placement of Such SMT integrated circuit devices on a PC board 36 approximately 22.4 cm long and 4.5 cm wide, and having four photosensor strips 56 each having 64 individual photosensitive elements mounted thereon, for a total of 256 photosensitive elements. Even greater packing densities could be achieved, if desired, by using other known methods, such as the use of custom integrated circuits.

A-2 FOCUSING THE IMAGE

Operation of the copyboard will best be understood with reference to FIG. 1. As depicted therein, the arm 18 laterally moves along parallel to surface of the board 10; the linear light source illuminates a small portion of the image 24 and light is reflected from surface 10 according to the local absorption properties of the image 24 and optical characteristics of background surface 10. Portions of the image 24 which are relatively bright reflect a relatively large amount of light, while portions of the image which are relatively dark, reflect very little light.

As shown in FIG. 3A, the light reflected from a long local surface area or strip 42 of the surface of the board 11 is reflected in all directions, including the direction substantially perpendicular to the surface 10 of the board 11. Arranged perpendicularly to the surface 10 is an elongated linear non-inverting imaging lens array 52. for example. a one-to-one magnification ratio lens array produced by Nippon Sheet Glass Company, Ltd. of Tokyo, Japan (Selfoc Lens Array, Catalog No. SLA-09). The lens array 52 is a linear array of lenslets each having an optical axis 54 which is operatively disposed with an optical axis perpendicular to surface 10. In addition, the lens array 52 has two focal lines: one focal line appears in the center of the local surface area 42 on the surface of the board 10, while the second focal line falls on the linear area or strip 44 of the linearly arranged photosensor array 57.

The precise width of the area 42 which is viewed for imaging by the array 57, will depend upon the specific Selfoc (TM) Lens selected. In one preferred embodiment, the focal length of each of the focal lines of lens array 52 is about 14 millimeters, and the width of the linear area 42 being imaged is about 0.87 mm. Accordingly, the proper placement of lens array 52 with respect to the surface of the board 10 allows focused images from that area of the board to be sensed. Through use of the appropriate optical system, the individual photosensitive elements of array 57 are each adapted to predominately sense only the light intensity reflected from preselected portions of the area 42 of the surface 10 of the board 11.

Photosensor chamber 32 is preferably configured so that the only light reaching photosensor array 57 is light admitted through lens array 52. The lens array 52 may be attached to side wall 43 of lower housing portion 18b, by any utilitarian method; such as, for example by an adhesive, or double-sided tape 45a. Similar strips of adhesive or tape 45b and 45c may be used to secure an elongated spacer member 46, which serves to close chamber 32 from admitting light. Spacer member 46 may be made from any suitable material, including foam rubber.

A-3. STRIP OF PHOTOSENSITIVE ELEMENTS

Figure 5A:
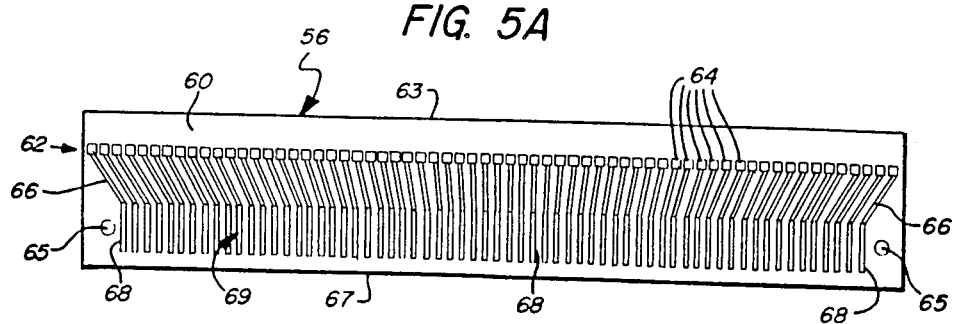
FIG. 5A is a top plan view of a strip of the sensing arm having 64 photosensitive elements operatively disposed thereupon.

FIG. 5A is a plan view of one embodiment of one photosensor strip 56. The strip 56 includes a linear array 62 of individual photosensitive elements 64, which may be, and preferably are rectangular in shape and disposed toward one edge 63 of photosensor strip 56. The individual elements 64 may be given other geometrical shapes if desired. The photosensor strip 56 preferably also includes a conductive trace portion 66 and a conductive contact pad portion 68 for each respective photosensitive element 64. The trace portion 66 and contact pad portion 68 are disposed so as to allow for electrical contact with the photosensitive elements 64 , while preventing shadowing or other interference therewith.

In the embodiment of the imaging system having a 44 inch (112 cm) long photosenstive array 57, the center-to-center spacing between adjacent elements 64 is preferably about 0.87 millimeters, and the distance separating each element 64 from adjacent elements 64 is preferably about 0.24 millimeters. The centers of adjacent individual contact pad portions 68 are preferably separated by 0.8 millimeters. This places the contact pads 68 closer together than the photosensitive elements 64, and thus provides room in the corners of the strip 56 for DC common or ground connections, which are typically required if the strip 56 is not provided with a ground or DC common in some other manner.

When photosensor strip 56 is made on a conductive substrate such as stainless steel, grounding can be provided by contacting the side of the substrate opposite the photosensitive elements 64. Preferably, however, the ground or DC common connection is provided to a conductive substrate by passing self-tapping screws through holes in the strip 56 at location 65, or by grinding or etching away any insulative coating which might be present at convenient locations, such as 65, and bonding or soldering a flexible conductor hooked to DC common or ground thereto. Failure to properly ground sensor strip 56 can lead to a degradation in the signal-to-noise ratio of the signals produced by the photosensitive elements 64.

Depending upon the technology used to produce the individual sensor arrays 56, it may be preferable to create arrays 56 having a smaller or large number of photosensitive elements 64. As shown in an enlarged view of a second embodiment in FIG. 5B, this number can, for example, be 64 elements. Four copies of these individual sensor arrays can then be placed in abutment to create a linear array of 256 photosensitive elements.

Figure 5B:
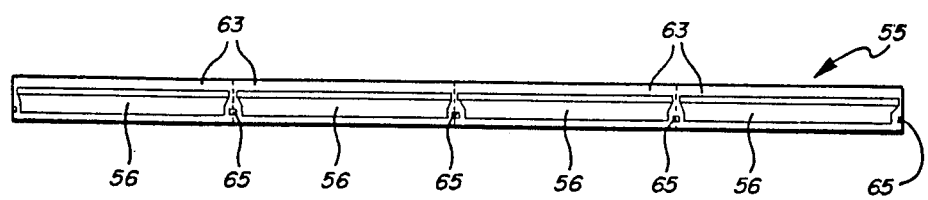
FIG. 5B is a simplifed plan view of a linear array having 256 photosensitive elements arranged as four groups of 64 photosensitive elements of the type shown in FIG. 5A.

FIG. 5B is a second embodiment of the linear sensor array 55 as adapted for PC board 36 use. In this embodiment, all of the sensing elements 64, traces 66 (most of the traces 66 are omitted from the figure for clarity), and contacts 68 are formed on a single substrate whose length is approximately equal to the length of the PC board 36. FIG. 5B shows that even though all 256 photosensitive elements of array 55 are made on a common substrate, they nevertheless can be grouped and interconnected in a manner similar to individual photosensor strips 56. The space between the grouping of contact pads 68 provides room for DC common or grounding contact pads 65, or holes as before. The FIG. 5B embodiment provides substantial economies of scale, because separate assembly of individual sensor strips 56 is rendered unnecessary. However, it also requires more stringent controls on processing of the photosensors since one bad photosensitive elements 64 effectively ruins the entire array 55.

Referring to FIG. 5A reference numeral 69 depicts a discrete pattern, generally formed from an electrically conductive material, a configurational pattern which is adapted and designed to comprise a sensor 64, a trace 66 and a contact pad 68. Each of the individual sensors 64 is preferably rectangular, as shown, with the longer side of the rectangle being transverse to the longitudinal axis of the strip 56 or array 55. The center-to-center spacing between adjacent photosensitive elements 64 is preferably equal to the longer side of a rectangular element. In this manner, each element 64 has a square-shaped effective scan area. In the 44 inch embodiments of the imaging system 15 having 1280 individual Photosensitive elements, the center-to-center spacing between adjacent elements is about 870 microns.

The individual photosensitive elements 64 in this embodiment preferably each have a size of about 870 microns by 640 microns, which leaves a gap or space of about 230 microns between adjacent elements.

A-4. THE PHOTOSENSITIVE ELEMENTS

Although the instant invention may be practiced with a number of different types of photosensors, such as photoresistors formed of cadmium sulfide, cadmium selenide, amorphous silicon, amorphous germanium and the like, one particularly useful type of photosensitive element is a photovoltaic element, which produces current and voltage upon illumination. Typically, low dark current, relatively high capacitance, photovoltaic cell structures are preferred. One, such a cell structure is a photodiode which is capable of operating in the fourth or power-generating quadrant of its I-V curve. In fourth quadrant operation of such photovoltaic structures, the amount of charge generated by each photosensitive element during a given frame or time period is directly proportional to the total amount of radiation incident upon that photosensitive element during that period. Accordingly, the relative darkness or lightness of the small portion of image projected onto each element can be determined by measuring or sensing the total integrated charge which has been stored therein. Before explaining the electronic circuitry used to Perform this sensing function, it is useful to explain the physical structure of the photosensor strips 56.

Figure 6A:
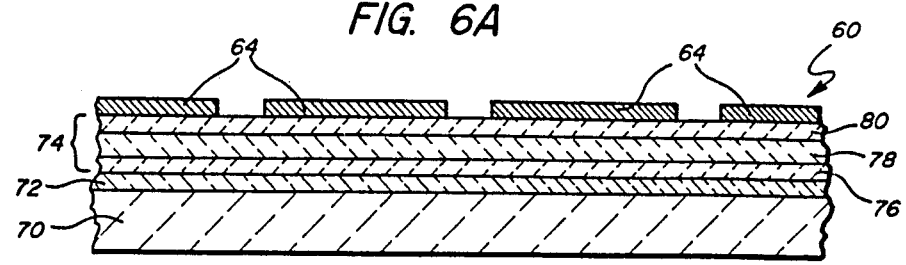
FIGS. 6A, 6B and 6C are fragmentary cross-sectional views of various constructions of the layers of amorphous semiconductor alloy material from which the photosensitive elements of the present invention can be fabricated.

Figure 6A is a cross-sectional view of a portion of one preferred embodiment of photosensor strip 56, comprised of an array of n-i-p type photodiode photosensitive elements 64. The photosensor strip 56 is preferably formed on a conductive substrate 70, which may be stainless steel about 0.007 inches (178 microns) thick, about 0.75 inches (19 mm) wide and about 2.2 inches (55.9 mm) long. Other substrates such as thin metals, or glass, or polymers having an electrically conductive coating thereupon may be similarly employed. Disposed atop the substrate 70 is a reflective layer 72, which may be made of a highly reflective metal such as aluminum, silver or the like and which is approximately 1000 angstroms to 1500 angstroms thick. A very thin layer of chromium (not shown) may also be deposited, if desired, on top of the reflective layer to prevent the back reflector material from diffusing into the subsequently deposited semiconductor layers. It should be noted however, that the use of a back reflector layer is not essential to the photovoltaic operation of the photosensitive elements 64 and accordingly, may be omitted.

Above the reflective layer 72 is a n-i-p multilayered semiconductor diode structure 74, which is preferably formed by the consecutive deposition of continuous layers of n type microcrystalline semiconductor alloy 76, intrinsic amorphous semiconductor alloy 78, and p type microcrystalline semiconductor alloy 80. It should be noted at this point that the terms "n-i-p structure" or "n-i-p diode" are meant to refer to all aggregations of n, i and p layers, without regard to sequence, and is specifically means to include p-i-n as well as n-i-p sequences of layers. Other semiconductor structures such as Schottky barriers, M-I-S devices, N-I-N devices, etc. are applicable with only minor changes to the remainder of the apparatus.

The semiconductor alloy material of layers 76 through 80 is preferably an amorphous alloy of silicon, germanium or germanium and silicon, including at least one density of states reducing element selected from the group consisting of hydrogen and fluorine. As used herein, the term "amorphous" includes all materials or alloys which have long range disorder, although they may have short or intermediate range order, or even contain at times, crystalline inclusions. Also, as used herein, the term "microcrystalline" is defined as a unique class of said amorphous materials characterized by a volume fraction of crystalline inclusions, said volume fraction of inclusions being greater than a threshold value at which the onset of substantial changes in certain key parameters such as electrical conductivity, band gap and absorption constant occurs. The doped layers 76 and BO may each range in thickness from 50 to 500 angstroms, and preferably each is approximately 100 angstroms thick. Intrinsic layer 78 may range in thickness from 1000 angstroms to 8000 angstroms, and preferably is about 0.6 microns thick.

A continuous layer of transparent, electrically conductive material such as, for example, indium tin oxide (ITO), is next provided atop and in electrical communication with the multilayered diode structure 74. The ITO layer is generally about 600 angstroms thick, although its thickness may be varied as is known to those in the art.

Following deposition of the ITO material, the individual elements are formed by a patterning process. It has generally been found sufficient to merely pattern the ITO in order to form electrically isolated elements, since the lateral resistivity of the underlying semiconductor material is sufficiently high to provide isolation. ITO patterning may be accomplished by any one of many techniques available to those skilled in the art. For example, photoresist techniques may be employed in conjunction with an acidic etchant; alternatively, a silk screen stencil may be utilized to apply a pattern of etchant reagent to the ITO layer. As a result of patterning, the individual photosensitive elements are defined. Additionally, the ITO may be patterned so as to define the traces 66 and contact pads 68 (see FIG. 5A) of the sensor array.

As mentioned previously, processing to remove semiconductor material between individual elements is generally not necessary. Consequently, processing equipment, cost and time are reduced. Since the ITO is significantly more electrically conductive than the underlying semiconductor materials and because the reading of each photosensitive element 64 occurs very quickly, photocurrents created under each rectangular element 64 remain associated with that element and not with adjoining elements. Therefore, the level of cross-talk due to leakage currents is well below the level which could cause a significant degradation in the image.

Figure 6B:
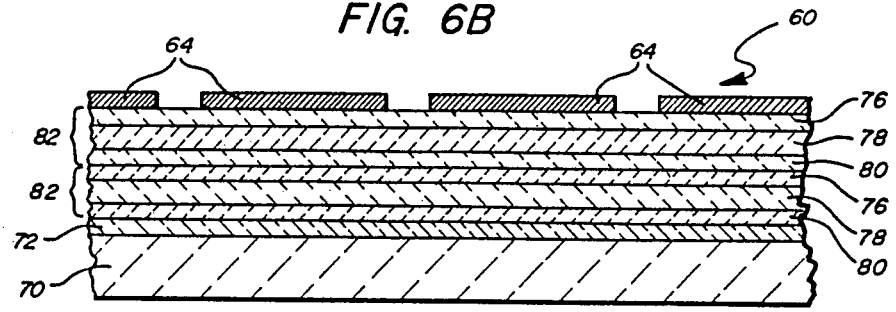

An alternative construction of photosensor strip 56 comprised of stacked, tandem p-i-n Photodiodes is shown in FIG. 6B. In this construction, the stainless steel layer 70 is overlaid by the conductive reflector layer 72 as before and additionally two amorphous semiconductor p-i-n diodes 82 are disposed in optical and electrical series relationship. Each diode 82 is constructed by consecutive deposition of p type semiconductor material 80, intrinsic semiconductor material 78, and n type semiconductor material 76. The thickness of the n and p layers 80 and 76 of diodes 82 may be the same as in diode 74 of FIG. 6A. However, the thickness of the intrinsic layers will generally vary. Since the topmost intrinsic layer is nearest to the source of illumination, it will receive a higher flux of radiation than will the subjacent intrinsic layer. In order to match the photocurrents produced in the two layers, the topmost layer is made thinner than the subjacent layer. The thickness of the intrinsic layer 78 of the upper diode 82 in FIG. 6B is preferably 3000 angstroms, while the thickness of the intrinsic layer 78 of the lower diode 82 in FIG. 6B is preferably 5000 angstroms. Above the semiconductor diode layers 82 is a layer of ITO which is configured as previously described with respect to FIG. 7A, so as to provide the desired element shapes or patterns 69.

Figure 6C:
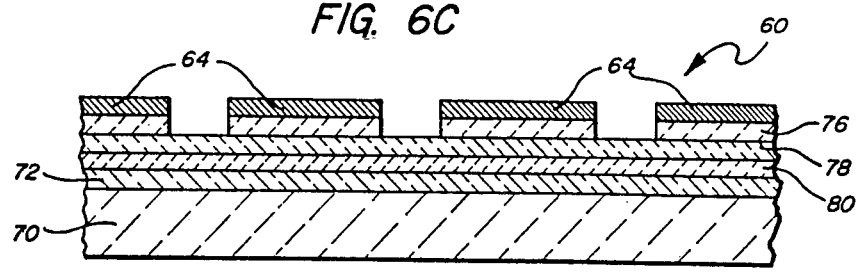

Another configuration of p-i-n type photosensor strip 56 is shown in FIG. 6C. Disposed upon the stainless steel layer 70 and the reflector layer 72 is a p type semiconductor layer 80, intrinsic semiconductor material 78, n type semicondcutor material 76, and an ITO layer. Following the deposition of these layers, both the ITO and n type semiconductor layers are patterned so as to produce the photosensitive elements. It has been found advantageous, in some instances, to etch away the n type semicondcutor layer since it has significantly higher conductivity than the other layers, and therefore can allow cross-talk between individual photosensitive elements.

Amorphous silicon or germanium alloy semiconductor material is preferably deposited in one or more contiguous layers by plasma-assisted chemical vapor deposition, i.e., glow discharge, as disclosed, for example, in U.S. Pat. No. 4,226,898 which issued on Oct. 7, 1980 in the names of Stanford R. Ovshinsky and Arun Madan, and in U.S. Pat. No. 4,485,389 which issued on Nov. 27, 1984 in the names of Stanford R. Ovshinsky and Masatsugu Izu, the disclosures of which are incorporated herein by reference.

The collection efficiency of the p-i-n diode structures of FIGS. 6A and 6B at one or more ranges of selected wavelengths of incident light may be altered or optimized by intentionally adjusting the band gap and/or thickness of each intrinsic layer 78. Such band gap adjustment techniques are known in the art of amorphous semiconductor solar cell design, and are disclosed, for example, in U.S. Pat. No. 4,342,044 which issued on July 27, 1982 in the names of S. R. Ovshinsky and M. Izu, the disclosure of which is incorporated herein by reference. The collection efficiency for different wavelengths of light can also be optimized by the presence or absence of reflecting layer 72, by varying the thickness of the ITO layer or by utilizing optical filters. In this regard it should be noted that response to IR radiation is Particularly desirable and the device can be so tailored for responding thereto.

Although the photosensor strips, arrays and the individual elements are described in FIG. 6 as thin film p-i-n amorphous silicon or germanium alloy semiconductor diode structures. any other thin film photoresponsive devices made from semiconductor materials which may be deposited over large areas or lengths with suitable photoresponsive and electronic characteristics may be used. Thin film heterojunction photodiodes. Schottky barrier photodiodes or MIS (metal-insulator-semiconductor) type photodiodes may be used, for example. Also, semiconductor materials such as gallium arsenide, cadmium sulfide, copper indium diselenide and other such materials may be employed in the practice of the instant invention.

Although the diode photosensitive elements 64 specifically described herein are preferably operated under forward bias in Quadrant IV of their I-V curve, they and other types of photodiode sensors such as the types described above may be operated in the third quadrant of their I-V curve, wherein they are reverse-biased and utilized to discharge previously charged elements. Techniques and circuitry used for reading such reverse-biased photosensitive elements are well known. Those skilled in the art should appreciate that the electronic circuitry disclosed herein is well-suited for use with photosensors operating in a reverse-biased condition, provided that appropriate modifications are made to those circuit portions closest to the photosensors in order to reverse-bias the photosensors and also in order to obtain unamplified analog signals from them.

A-5. PROCESSING THE PHOTOSENSITIVE MATERIAL

The multilayered solar cell material on a stainless steel substrate of the general type described in FIG. 6 is commercially available from Sovonics Solar Systems, Inc., of Troy, Mich., where it is made by continuous roll-to-roll processing equipment in 1000 foot rolls nominally 14 inches wide. This material may be purchased with or without an ITO top layer and in either single solar cell or tandem solar cell configurations. Accordingly, when this purchased material is used, it is only necessary to cut the roll into appropriately sized photosensor array strips 55 or 56 and pattern the ITO to form the individual photosensitive elements 64 and their respective traces and contact pads.

One method for manufacturing the linear sensor array 55 shown in FIG. 5B from the aforementioned continuous roll of solar cell material is illustrated in FIG. 7. According to this method, a long roll or continuous web 220 of amorphous silicon solar cell material, is cut into large rectangles 222, using any suitable technique, but preferably by the rear contact methods disclosed in U.S. patent application Ser. No. 718,770 filed Apr. 1, 1985 in the names of P. Nath and A. Singh, and entitled "Method of Severing a Semiconductor Device and Article for Severing," the disclosure of which application is incorporated herein by reference. For ease of illustration in FIG. 7, the cut 223 is shown as having been made by a mechanical blade shear device 224 drawn transversely across the web of solar cell material while pressed downwardly against resilient base 225 which provides support for the web near the cut. As explained in the aforementioned patent application, it is preferred to place the transparent conductive layer face down against the resilient base 225, and cut from the substrate side of the continuous web. This helps prevent shards of ITO produced by the severing action from shorting out the solar cell material.

Each resulting rectangle 222 is subjected to patterning or scribing steps which simultaneously produce as indicated on rectangle 222' several sensor strips of the sort shown in FIG. 5B. If rectangle 222' has dimensions of approximately 12 inches by 12 inches, 18 strips, each approximately 11 inches in length and containing 256 individual photosensitive elements 64 can be simultaneously created. After their creation, each of the 18 strips 226 is severed from rectangle 222" to form a sensor strip of the type shown in FIG. 5B.

This severing is done along dotted lines 227 which indicate the longitudinal edges of the strips 226, and preferably does not involve cutting across any of the patterned ITO. The strips 226 are then preferably tested for any internal shorts and for incomplete etching or scribing between the photosensors. After testing, the individual strips 226 are cut to the precise length required for installation onto PC board 36. The longer strips 226 which have one or more bad elements 64, but nevertheless have a sufficient number of consecutive good elements can be cut into one or more smaller strips 56. The ground contact or the mounting holes are preferably made after the strips 226 are tested. However, if desired, these vias or holes can be made before testing, such as part of the etching and scribing steps. Obviously, other sequences of Patterning, scribing and severing steps can be utilized.

B. THE LENSELESS SYSTEM

While the foregoing discussion was primarily concerned with an imaging system which utilizes lenses or other optical elements for the conveyance of light from the surface being scanned 10 to a linear array of photosensitive elements 64, the instant invention is obviously not so limited. In many instances, lenses or other optical elements may be completely dispensed with and a simple mask having a plurality of apertures therein, or other such lenseless means, may be employed to restrict and guide light, either transmitted or reflected from the surface being scanned to the corresponding photosensitive elements. It should be noted, that as used herein, the term "light emanating from the surface" is meant to include light transmitted through or reflected from the surface being scanned, said light having an intensity corresponding to the pattern of information on that surface.

Referring now to FIG. 8, there is shown one preferred embodiment of an imaging system structured and operative to be utilized in a lensless fashion. In this instance, the system 402 is depicted as operating in a light transmissive "i.e. backlit" mode. An elongated light source 34 projects a beam of radiation 34a through a transparent sheet 400 upon which the image being scanned is disposed. The sheet 400 absorbs or transmits the incident radiation depending on the presence or absence of an image thereupon. The radiation transmitted therethrough passes to the lensless imager 402 of the instant invention. The lensless imager 402 comprises an array 56 of photoresistive elements, generally similar to those arrays previously described. The component which makes the lensless imager feasible is the apertured mask 404, which functions as an optical element for directing radiation emanating from particular portions of the surface being imaged, in this case the sheet 400, to the corresponding photosensitive elements.

As depicted, the mask 404 is formed of a relatively opaque material, such as printed circuit board material, metals, polymers and the like. The mask includes a plurality of openings 406 therein, each opening optically aligned with a photosensitive element 64 of the array 56. The openings 406 are relatively deep openings, that is to say they have a high depth to diameter ratio and as such function to collimate or otherwise restrict the angle of view of the photosensitive element 64 disposed at the distal end thereof to a relatively narrow portion of the surface 400 being imaged. The dashed lines shown intersecting within various of the openings 406 are indicative of the angle of view of the photosensitive elements as restricted by the mask 404.

It will be noted from a review of FIG. 8, that as the surface being scanned 400 is moved farther away from the mask 404, the area viewed by the individual photosensitive elements will expand and eventually overlap of the adjacent areas can occur. Some degree of such overlap can be tolerated insofar as the electronic circuitry of the instant invention utilizes a weighted, or self-calibrated measurement to determine whether any discrete element 64 is imaging a light or dark area; however, extreme overlap will result in spurious or erroneous signals. Consequently, care must be taken to assure maintenance of proper spacing between the scanner mask 404 and the surface being imaged 400. Such spacing can be assured by utilizing one or more rollers (not shown) which contact, in a biased manner) the surface being scanned and thus maintain proper distance. In other instances, the mask itself may be placed in contact with the image-bearing surface and moved thereacross. In such contact embodiments, a wear plate or other such member may preferably be interposed between the mask 404 and the image-bearing surface 400 so as to eliminate damage to the surface or wear to the mask. It is important to note that the mask, when utilized in a surface contacting embodiment, contacts said surface only after the photosensitive elements have reproduced the image disposed thereupon. By so having the mask-contacting portion (and obviously any rollers) laterally displaced relative to the photosensitive array, the image is not deleteriously smudged and the mask can also be adapted to provide an erasing function.

The light source, is shown as an elongated fluorescent tube 34 oriented so as to back light the surface 40 being scanned. Obviously, other such arrangements may be utilized in conjunction with the instant invention. For example, a front surface illumination system, generally similar to that depicted in FIG. 3A may be advantageously employed. In such an instance, an elongated light source such as a fluorescent tube is mounted within the scanner arm and oriented so as to reflect light from the surface being scanned. In some instances, it may be advantageous to include a lens or other light concentrating or enhancing element in conjunction with the light source, for purposes of directing and more efficiently utilizing light for illumination of the surface. Such embodiments are intended to be within the scope of the instant invention and for purposes of present discussion are considered "lensless" because the sensor array 56 does not utilize optical elements. While fluorescent light sources have been described, other light sources such as a linear array of light emitting diodes may also be utilized to illuminate the surface being scanned.

Various modifications to the aforedescribed system will be readily apparent to one of skill in the art. For example, the openings 406 in the mask 404 may be filled with an optically transparent material, such as a polymeric resin so as to function as fiber optic elements for more efficiently conveying light therethrough. In other instances it may be desirable to provide the interior surface of the openings 406 with a reflective coating to assist in the efficient passage of light therethrough; while in other instances it may be desirable to provide these interior surfaces with a light absorbing coating so as to restrict the angle of view of the photosensitive elements 64 and thereby prevent collection of spurious light. In other instances, it may be desirable to include a plurality of masks in aligned relationship to further collimate and collect light emanating from the surface being scanned. These masks may be of differing diameters so as to form a tapering optical path thereby providing a still further restricted angle of view for the discrete photosensitive elements.

These, as well as other variations in the lenseless optical system should be readily apparent to one of skill in the optical arts and need not be elaborated upon in greater detail herein, it being kept in mind that the instant invention is meant to specifically include a lensless optical system for directing light from particular portions of a surface being scanned 400 onto corresponding photosensitive elements 64, said mask 402 necessarily being maintained in relatively close proximity to said surface.

C. THE ELECTRONIC CIRCUITRY

Figure 9:
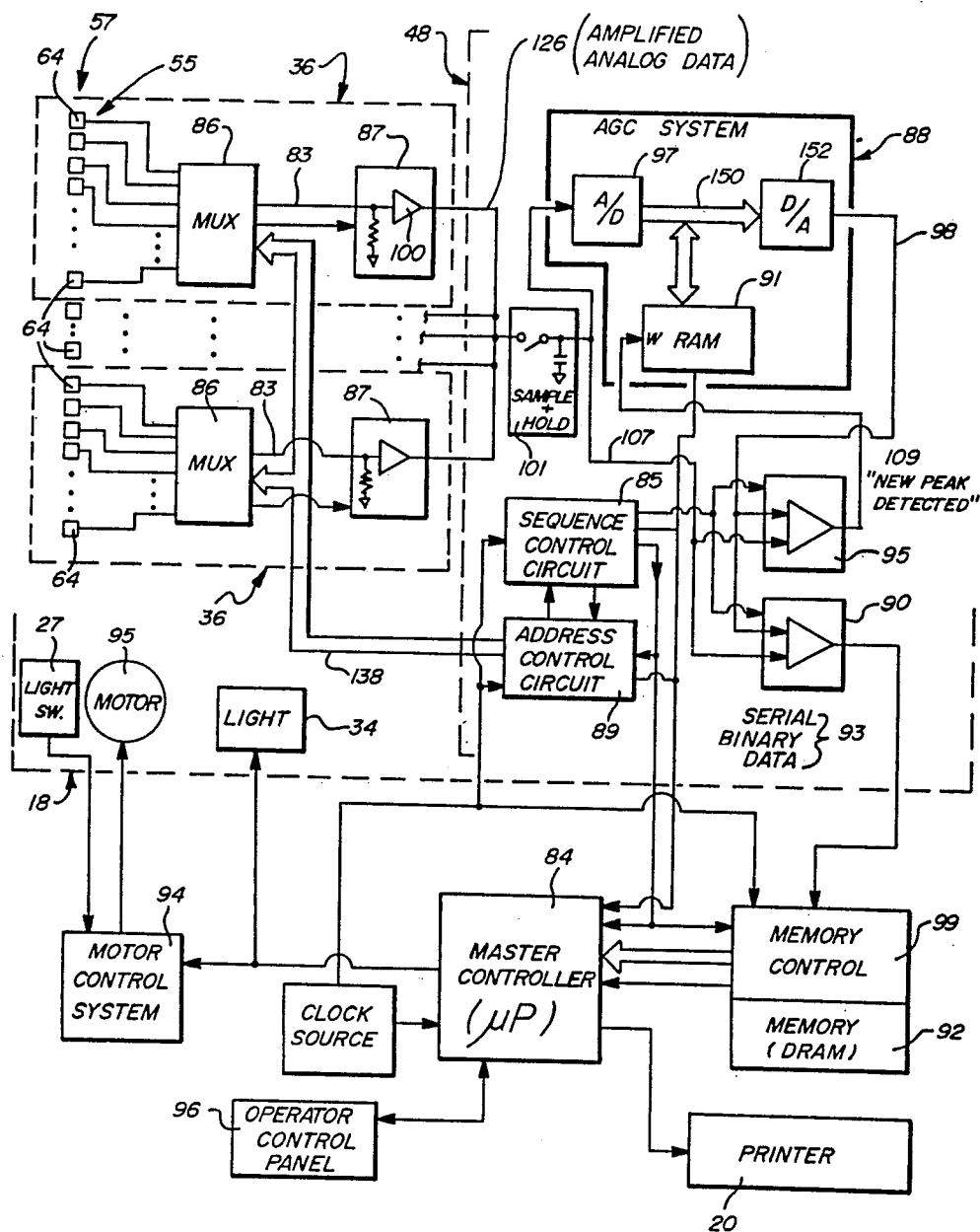
FIG. 9 is a block diagram illustrating the operation of an electronic copy board of the type shown in FIG. 1, which board includes the imaging system of the present invention.
Figure 10A:
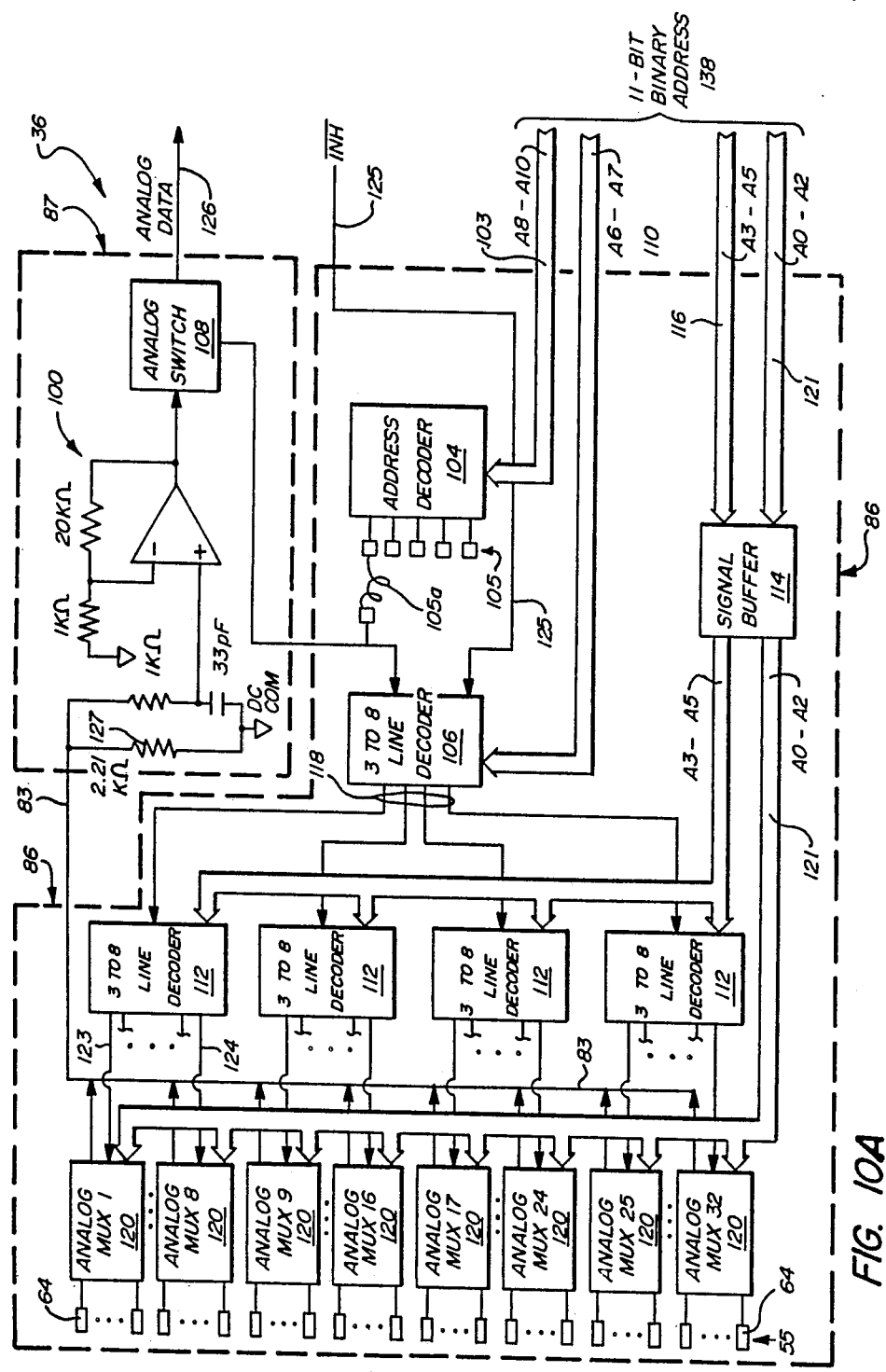
FIG. 10A is a detailed block diagram illustrating a preferred circuit for the photosensor-carrying printed circuit board of FIG. 4.
Figure 10B:
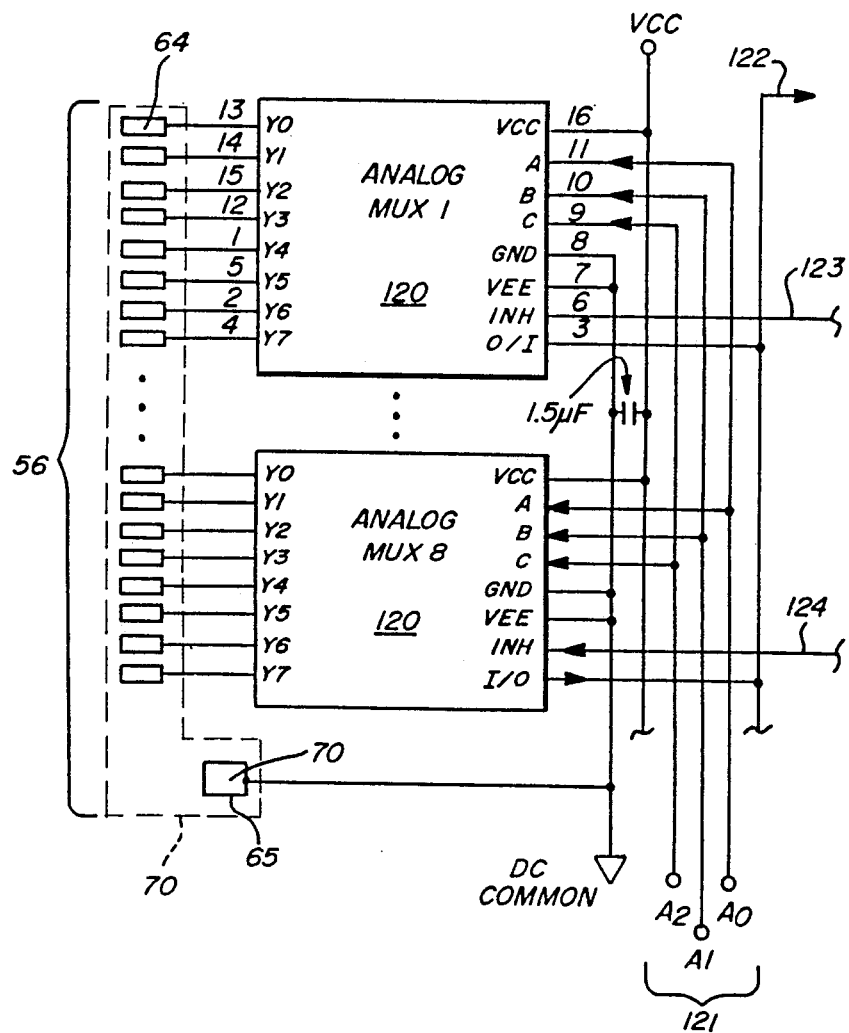
FIG. 10B is a wiring diagram for two of the analog multiplexers shown in FIG. 10A.
Figure 11:
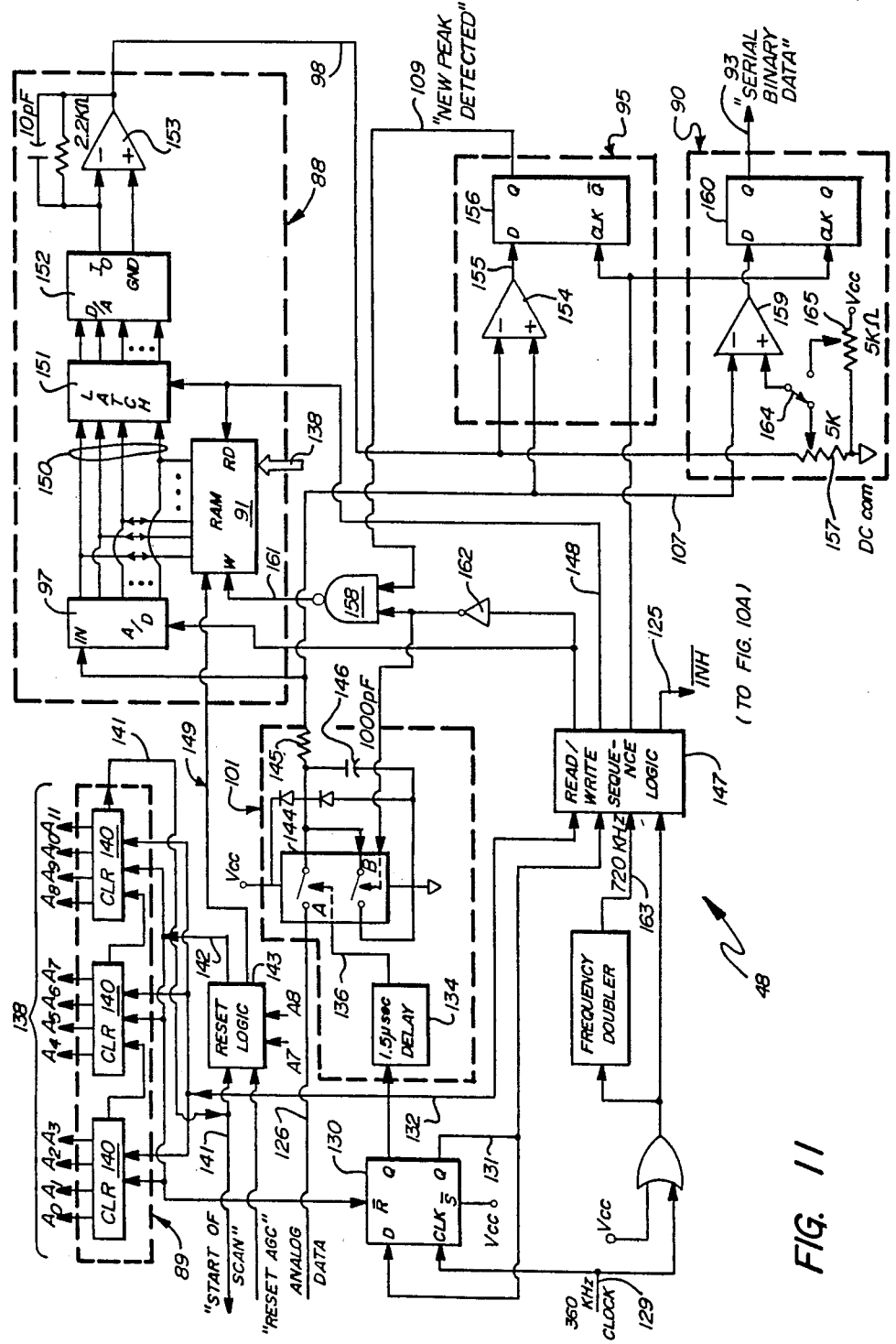
FIG. 11 is a detailed block diagram of a Preferred circuit for the signal comparison, automatic threshold adjustment, and control electronics of the imaging system of the present invention.

FIGS. 9 through 11 are devoted to the preferred circuitry for an imaging system 15 of an electronic copy board of the type shown herein. For ease of the presentation, the circuitry will be discussed with respect to the FIG. 1 copy board. Those in the art should appreciate the direct applicability of the circuitry to the various other imaging systems, including those imaging systems which do not use a linear optical lens array 52.

FIG. 9 is a general block diagram of the preferred circuitry of an electronic copy board of the type shown in FIG. 1. The various blocks of circuitry and components preferably included as part of the imaging system 15 and located within the arm 18 are shown in FIG. 9 above the horizontal dashed line identified by reference numeral 18 and bisecting FIG. 9. The circuitry and components of the electronic copy board 11 which preferably do not constitute part of the arm 18 are depicted below this horizontal dashed line. The blocks of circuitry of the imaging system 15 which control the timing and order in which signals are obtained from the individual photosensors of the linear sensor array 57 are shown in the upper right portion of FIG. 9. This control circuitry is preferably located on a single PC board, such as PC board 48 in the foregoing figures. The upper left portion of FIG. 9 shows in block diagram form the circuitry of two representative PC boards 36, the locations of which are indicated with dashed lines. Each board 36 contains a linear photosensor array 55 that constitutes part of the larger sensor array 57. The remaining PC boards 36 are not shown in FIG. 9, but their absence is indicated by ellipses between the two PC boards 36 that are shown.

The functions of the various blocks of circuitry in FIG. 9 can best be described by generally explaining the operation of the imaging system 15. Photosensor array 57 receives light reflected from the surface being imaged. A master controller 84, which is preferably microprocessor-based, is provided to control the overall operation of the electronic copy board, i.e., to initiate the operation of imaging system 15, and to coordinate operation of the printer 20 and movement of the arm 18. Microprocessor 84 initiates operation of the imaging system 15 when it receives a "start of scan" signal from the sequence control circuit 85. which allows address control circuit 8g to generate binary addresses corresponding to individual elements 64 in the array 57. The addresses are fed out on address bus 138 to multiplexers 86 in each of the PC boards 36. The multiplexer 86 of each PC board (1) recognizes selected addresses impressed on bus 138 which correspond to specific sensors 64 associated with that boards sensor array, (2) sequentially obtains analog signals produced by the selectively addressed photosensors and (3) feeds these analog signals in multiplexed fashion onto an intra-board analog bus 83. After passing through an amplifier and isolator circuit 87 which includes an amplifier 100, the multiplexed signals are fed over an inter-board analog bus 126 to a sample and hold circuit 101. An automatic gain control (AGC) system BB is provided to generate a variable threshold signal on line 98 so as to determine whether the amplified sensor signal just received from bus 126 by sample and hold circuit 101 represents a light or dark portion of the overall image 24. The light-dark distinction is made by comparator circuit 90, which produces a digital output signal on line 93. The sample and hold circuit 101 is adapted to receive and hold the amplified photosensor signal on output line 107 without change for a brief period to facilitate making this comparison.

If desired, the amplitude of variable threshold signal from AGC system 88 that is impressed on line 98 may be reduced by some fixed value by placing a signal divider network between line 98 and the negative input to comparator circuit 90. The preferred embodiments of the circuitry of PC board 48 shown in FIG. 11 use such a signal divider network in order to finely tune the ability of imaging system 15 to discriminate correctly between light and dark portions of a lightly saturated colored image.

If desired, the AGC system 88 can be disabled by connecting the positive input of comparator circuit 90 to a fixed signal, such as a fixed voltage determined by a voltage divider circuit. Circuitry for doing so is shown in FIG. 11.

The multiplexers 86 and amplifiers 100 are Preferably located in close proximity to the photosensors 64 they service, in order to minimize conductor lengths, reduce fabrication costs, and minimize pick up of electrical noise on low power signal lines. For the same reasons, automatic gain control system 88, comparator circuit 90 and other blocks of circuitry on PC board 48 are preferably located within the lower arm portion 18b. The output signals produced by comparator circuit 90 are sent via line 93 to memory control circuit 99 for further processing and conditioning relating to properly driving printer 20. Circuit 99 puts the output signals into proper form or format for storage in memory 92 or for being sent to printer 20. Circuit 99 may include a counter system which independently keeps track of the current address generated by address control circuit 89. Circuit 99 may be implemented with a conventional programmable logic array.

The output signals of comparator circuit 90 Preferably take the form of a serial digital bit stream representing the light or dark state of the photosensors 64 as determined by sequentially reading them (that is, sensing the level of the charge stored on them). The multiplexed binary information produced by comparator circuit 90 may, if desired, be stored in a memory 92 (which may contain approximately 512 kilobytes of data in 8 bit bytes). Under control of microprocessor 84, data from memory control circuit 99 or stored data from memory 92 is sent to the printer 20. The use of memory 92 for data storage makes it possible to obtain additional copies of the last image 24 on board surface 10 scanned by arm 18 without the need to operate arm 18 again.

A modified form of the imaging system of FIG. 9 can be created by eliminating memory 92 and sending the serial data signals from conductor 93 through a conventional serial-to-parallel conversion circuit associated with memory control circuit 99 and then through microprocessor controller B4 to printer 20. While this will require a scan of arm 18 for each copy of the image which may be desired. the absence of the memory IC chips required for memory 92 will provide for an especially economical imaging system of the present type. Almost all of the memory control circuit 9g including the programmable array logic can be omitted to further reduce costs.

Conventional print control signals are produced by microprocessor 84 and sent to printer 20. Microprocessor 84 further operates a motor control system 94 which energizes drive motor 95 to cause arm 18 to scan the surface of the board from either the right or the left. The motor control system 95 preferably includes two conventional limit switches 26 which may be mounted on the trolley of arm 18 as previously described in FIG. 2, to detect end-of-board-surface conditions (an appropriately placed cam) when the arm 18 is at the far right or far left side of the board. Microprocessor 84 also switches the light source 34 on when a copy is to be made of the image on surface 10, and switches it off afterwards.

By means of user control buttons located on an operator control panel 96 which is preferably mounted on or near the printer housing, microprocessor 84 can be instructed to perform desired operations, such as "COPY", "STOP/CLEAR", "MOVE ARM LIFT", "MOVE ARM RIGHT" and to provide multiple or scaled copies. Providing variable scale for copies involves data manipulation which may be performed by microprocessor 84 using techniques known in the art that need not be repeated here.

Individual photosensors 64 may have photoresponsive characteristics which differ appreciably. Likewise, their associated electrical circuits and connections, including those within multiplexer 86 and amplifier circuit 87 all the way to analog bus 126, may have also differing electrical characteristics. Thus, equal amounts of light on respective cells or sensors may produce significantly different signal levels on bus 126. The Photoresponsive and/or electrical characteristics of individual photosensors and associated circuits may also change with time due to aging of optical or electrical components. The contrast of the image 24 to be scanned may vary greatly, due to the use of colors of widely differing hue and saturation and due to changing illumination conditions, discoloration of the board surface 10, and the like.

To minimize the impact of such image variables and to assist in producing high quality images, automatic gain control system 88 is provided, as shown in FIG. 9. AGC system 88 includes memory 91, which preferably is a random access memory having sufficient size to store at least a word or byte of information for every single photosensor 64 in array 57. The word or byte size is preferably 8 bits in RAM 91. The information stored in discrete word locations in RAM 91 preferably corresponds to the highest signal levels produced by the individual photosensors 64 during the current transverse movement scanning of the arm 18 from one side of the surface 10 to the other side. The AGC system 88 shown in FIG. 9 helps improve the performance of the imaging system 15 by effectively customizing the comparison made at comparator circuit 90 to take into account the individual optical and electrical characteristics of each photosensor 64, as determined under very recent dynamic conditions during the current transverse scanning movement of arm 18.

The AGC system 88 preferably operates as follows. At the beginning of a scan, the sequence control circuit 85 sends a "Clear" signal to RAM 91, causing all memory locations therein to be cleared or set to zero. Thereafter, in synchronism with the operation of multiplexer 86, and in conjunction with the address produced by address control circuit 89, data stored in the word location of RAM 91 addressed by address generator 89 is read and converted to analog form by digital-to-analog (D/A) converter 152. The output of D/A converter 152 is compared with the current signal on analog bus 107. (In practice, the current value may be and preferably is scaled downward by a fixed percentage.) Signal 98 is supplied to one input of comparator circuit 90. The voltage supplied on line 107 to the other input of comparator 90 is the amplified signal generated by the presently addressed photosensor 64, which was received and held by sample and hold circuit 101. If the signal produced by D/A converter 152 is less than the held signal on line 107, the instant signal level from the specific photosensor being addressed must be higher than any previously encountered signals, and the comparator circuit 95 sends via line 109 a "write" signal to RAM 91, which loads a new value into the presently addressed location in RAM 91. The new value is obtained from the amplified photosensor signal on analog bus 126 which has been converted to digital form by analog-to-digital (A/D) converter 97, and placed on digital bus 150. If the held signal on line 107 is less than the signal produced by D/A converter 152, no "write" signal is sent to RAM 91 and the contents of the currently-addressed location of RAM 91 are unchanged.

Using this method, the contents of the locations in RAM 91 (wherein each location corresponds to a different sensor in sensor array 57) are updated whenever the current signal level of an addressed photosensor 64 is higher than the levels previously produced by the same photosensor during the current transverse scanning movement of arm 18. Through this operation, RAM 91 collects a set of digital values which represent both the efficiency of the optical channel of each individual sensor 64 in sensor array 57 and the efficiency of the electrical channels leading from each sensor 64 to analog bus 126. These efficiency measurements take in account variations in both light source 34, the optical path, and in the photo conversion efficiency of the photosensors. The amplitude of the output signal or voltage on line 98 produced by D/A converter 152 thus represents maximum brightness received by the corresponding photosensor 64 since arm 18 has begun its present scanning motion.

Alternatively the AGC system 88 may be modified to store a single peak value for a group of elements, said elements 64 characterized by substantially similar electrical responses. For instance, peak photoresponsive values generated by a discrete element of the group disposed on a common strip 56 is utilized as a representative signal against which the compare data signals originating from the other elements, as well as from its own photogenerated value, is compared. Thus, the number of values which need to be stored in memory 91 can be reduced. As a second example, peak values from one of the eight elements 64 read through a single multiplexer IC chip 120 (shown in FIG. 10B) could be used as a representative value for all eight elements 64 connected thereto. This arrangement has the advantage of minimizing values stored in memory 91, since significant variation in electrical characteristics between the eight electrical switch paths or channels within a single IC chip is unlikely. Accordingly, memory requirements are reduced, while preserving the ability of the AGC system to compensate for variations between groups of elements 64. Since fewer accesses to the AGC system 88 need be made in both of these alternative exemplary embodiments, the overall scanning rate can increase by omitting certain sequence steps during the reading of elements 64 not used to provide representative peak values.

FIG. 10A is a schematic diagram of the electronic circuitry of one of the five photosensor PC boards 36. The circuitry of PC board 36 receives an 11-bit binary address along address bus 138 from the address control circuit 89, which is more specifically described in FIG. 11. The three most significant bits of this address on lines A8-A10, identified by reference numeral 103, are received by three bit address decoder 104 which produces an output signal on one of its five output pins 105, which signal corresponds to the three bit address received. Each of the five PC boards 36 in the imaging system 15 is given a different address, which corresponds to its relative position in arm 18, by connecting a different output pin 105 of address decoder 104 via a jumper 105a to the rest of the circuitry on PC board 36. This ensures that microprocessor 84 is selecting only one of the five PC boards 36 at a time. Only when the particular PC board 36 is selected will its "three line to eight line" decoder 106 and its analog switch 108 be enabled. Analog switch 108 is an isolation device used to prevent the amplified output signals from more than one PC board 36 from being simultaneously impressed on the inter-board analog data bus 126 leading from the various amplifier and isolation circuits 87 of the PC boards 36 to the AGC system 88.

Binary address signals on lines A6-A7 identified by reference numeral 110 are received directly by decoder 106 to specify which one of the four decoders 112 to activate. Binary address signals received on lines A3-A5 identified by reference numeral 116 are passed through signal buffer 114, which provides proper fan-out of these signals, to four "three line to eight line" decoders 112. Decoders 112 are individually and sequentially activated by signals sent over lines 118 in response to address signals A6 and A7 when decoder 106 is activated. The activated decoder 112 in turn enables only one of the eight analog multiplexers 120 to which it is connected, via lines 123 and 124 that are also connected to analog multipliers identified as "MUX 1" and "MUX 8" respectively. There are 32 multiplexers 120 on PC board 36. Only one multiplexer 120 is enabled at any one time. The rest are inhibited so as to prevent spurious signals from reaching intra-board analog bus 83. Each of the 32 analog multiplexers 120 receives the least significant address bits signals on lines A0-A2 identified by reference numeral 121, which lines also pass through signal buffer 114 to provide proper fan-out.

When a particular analog multiplexer 120 has been activated, the low order address signals A0 through A2 indicate which one of the eight photosensors 64 to which the multiplexer 120 is connected is to be read. The analog signal of the photosensor 64 selected by the particular analog multiplexer 120 is sent over intra-board analog bus 83, through a high frequency noise filter, to the input of voltage amplifier 100. The amplified signal produced by amplifier 100 is received by analog switch 108, which is closed when enabled, and thereby reaches analog bus line 126.

FIG. 10B is a more detailed schematic diagram showing the preferred wiring arrangement used when the analog integrated circuit (IC) chip used for all multiplexers 120 is a Signetics Part No. HEF4051BTD. Tying the "$V_{EE}$" pin of this chip to DC common was found to reduce undesired cross-talk among photosensors 64 connected to the same multiplexer chip 120.

Each multiplexer 120 is preferably kept continuously inhibited until such time during the scanning of array 57 that its photosensors 64 are sequentially addressed. In order to improve the signal-to-noise ratio of the signals from photosensor 64, it has been found beneficial to inhibit each multiplexer except during that period of time required to read each individual photosensor 64. Inhibiting each multiplexer 120 when the address impressed on bus 138 is being changed so as to read the next photosensor on the same multiplexer, is an important and effective way to do this. To inhibit each multiplexer 120 in this manner, an inverted inhibit signal from the sequence control circuit 85 is provided to each decoder 106 via line 125 as shown in FIG. 10A. When line 125 is low, decoder 106, and its associated decoders 112 and multiplexers 120, are all inhibited.

The photosensors 64 described in FIG. 7 are each preferably operated as miniature solar cells. The amount of photogenerated current produced by the sensors is relatively low, and the capacitance of the sensor is relatively high, owing to the relatively large electrode traces and contact pads thereof. Therefore, the sensors not only produce, but also accumulate charge from one scan to the next, the magnitude of the charge corresponding to the total amount of light incident thereon. Each photosensor 64 is preferably completely discharged when read. A preferred method of reading of a photosensor 64 involves passing its accumulated charge through its multiplexer 120 to intraboard bus 83, and dumping this charge across grounded load resistor 127 (See FIG. 10A). The flowing charge generates a voltage across resistor 127, and the magnitude of the voltage corresponds to the level of the accumulated charge. This voltage is fed through a high frequency noise filter to the positive input of amplifier 100. The noise filter is typically a RC filter which reduces the stray signals on line 83, induces by switching of the decoder 112. The amplifier 100, amplifies the input voltage by some fixed amount such as twenty times. The amplified signal is then passed through analog switch 108 to intra-board bus 126 as previously described.

It has been found that the amplified signal from each photosensor 64 uniformly rises quickly to some characteristic maximum value in about one-half microsecond or less and then steadily decays along some RC time constant curve. The rate of decay is largely determined by the capacitance of the sensors 64, the stray capacitance in the connections through the analog multiplexers to the bus 83, and the value of resistor 127. The magnitude of the voltage developed across the resistor 127 is largely proportional to the amount of accumulated charge on each photosensor 64. The sample and hold circuit 101 (shown in simplified fashion in FIG. 9) is preferably operated so as to sample the amplified decaying signal on bus 126 at some point approximately midway through the several microsecond read time used for each photosensor. This timing arrangement and circuit 101 are more completely described in conjunction with FIG. 11.

One important advantage of using this and other signal processing techniques and photosensors described herein is that the signal-to-noise (S/N) ratios for the imaging system 15 are very high, generally 40 dB and above, and may be 45 dB to 50 dB or better under adequate illumination conditions and charging times as described elsewhere herein. This high S/N ratio is achieved in part by minimizing the number of digital or extraneous analog signals changing state in the electronic circuitry of the arm 18 during the initial reading of each photosensor 64 until the sample and hold circuit 101 begins to hold the sampled amplified signal from bus 126. The foregoing sampling is preferably during a quiescent period after all of the switching transients associated with the addressing circuitry 89 address bus 138 switching multiplexers 120 and the like have passed, thereby improving the S/N ratio. Furthermore, the amplifier circuits and associated components are selected and arranged to be sufficiently slower than the transient switching effects so that there is still a representative analog signal being produced from photosensors 64 at the sampling time. In this manner, electrical noise from all other data and control signal sources within the arm is substantially eliminated or at least greatly reduced.

To achieve maximum linearity of the individual photosensors 64 when operating in the photo-generation mode, it is preferred that the photosensors, when under full illumination (i.e., sensing a fully white surface) only charge to 10 to 20 percent of their open circuit voltage $V_{OC}$ (i.e., the maximum charge and voltage of the solar cell if allowed to charge indefinitely). For the single diode and tandem configurations of FIGS. 7A and 7B, the $V_{OC}$ is about 0.6 volts and 1.2 volts respectively. The intensity of the illumination provided by light source 34 on thin strip 42 of the image 24 being scanned directly affects the rate at which the photosensors 64 will charge. Under illumination levels about $1 \times 10^{-4}$ watts cm$^{-2}$ the charging times required for tandem diode photosensors 64 of the type shown in FIG. 6B to achieve 10 to 20 percent of $V_{OC}$ is on the order of one to ten milliseconds; and is typically three to eight milliseconds, depending on the spectral distribution of the incident light, optical absorption by the lens array 52, the spectral response or collection efficiency of the photosensors, and the like.

It has been determined that a linear photosensor array as described herein, and fabricated from amorphous silicon alloy semiconductor material, and operated in the fourth quadrant mode as described herein, is very well suited for high speed image scanning. Such a linear photosensor array has the ability to supply analog (video) data at rates sufficient to meet CCITT Group 2 and Group 3 facsimile standards. It has also been found that signal-to-noise ratios and "gray scale" detection capabilities are also excellent, in spite of the very low voltage and charge generating capabilities of the individual photosensors 64.

In an embodiment as described hereinabove, where the address on the bus is changing at a frequency of about 187.5 kilohertz, a single scan of all 1280 photosensors in the overall photosensor array takes approximately 6.8 milliseconds. This speed averages out to a net total of about 5.33 microseconds per photosensor 64. It is preferred to actually read each individual photosensor 64 within a period of approximately four microseconds or less. As will be seen with respect to FIG. 11, the actual time required to read each photosensor by sample and hold techniques can be in the range of about two microseconds or less. Following each scan, an interval of about 0.7 milliseconds is preferably provided before the next scan begins, during which time the microprocessor 84 performs house-keeping functions, which include checking the pushbuttons at the operator control station, checking the end-of-board-surface limit switches, and similar routine status checks. The repetition period for the scanning operation is thus about 7.5 milliseconds. The outputs of sensors 64 in sensor array 57 are preferably read consecutively in accordance with monotonically changing value of the 11-bit address input provided to the circuitry on PC board 36. The analog data thus read from the sensors 64 is sent from the PC boards 36 via analog bus 126 to PC board 48 (in FIG. 3A) which contains the automatic gain control circuitry 88 and comparator circuitry 90 and 95.

The photosensitive elements 64 may alternatively be read by utilizing amplification circuit 100 as a current amplifier (rather than as a voltage amplifier as described above). To transform the amplifier circuit 100 of FIG. 10A into a current amplifier, simply omit resistor 127 and directly connect analog bus 83 to the positive input of the operational amplifier in circuit 100. This current amplification embodiment provides the important advantages of achieving: (1) even faster reading speeds, (2) improved signal-to-noise ratios, (3) greater linearity of true correspondence amount of charge stored on each element 64 and the amplitude of the amplified data signal captured by sample and hold circuit 101, and (4) reduced current leakage between adjacent elements 64. For example, tests show that with the Texas Instruments operational amplifier specified for circuit 100 in the table below, each of the elements 64 can be read in approximately 600 nanoseconds. By using circuit components having even faster slew rates, reading time may be further shortened thereby providing the scanning rate of the imaging system 15 to be significantly increased.

FIG. 11 is a schematic diagram of the circuitry contained on PC board 48 of FIG. 3B. Flop-flop 130 receives a 360 kilohertz clock signal on line 129 from a suitable external clock source such as the conventional time base used by the microprocessor 84. Flip-flop 130, operating in "divide-by-2" mode, produces a 180 kilohertz clock signal on line 132 and its complement on line 131. The 180 kilohertz clock signal on line 132 is fed to delay device 134 of the sample and hold circuit 101. Delay device 134 provides a predetermined microsecond range time delay signal on line 136. When amplifier circuit 100 is adapted for use as a voltage amplifier, device 134 holds its output on line 136 high for a brief period preferably in the range of 1.3 to 1.5 microseconds following the rising edge of the clock signal on line 132 and then allows output 136 to go low again, thus creating a signal useful for precisely timing the sampling period of circuit 101. When circuit 100 is a current amplifier, delay device 134 is adapted to only hold line 136 high for about 600 nanoseconds.

The clock signal on line 132 is also used to generate the 11-bit address 138 used by the circuitry of PC boards 36 shown in FIG. 10A. The 11-bit address control circuit or generator 89 may comprise three binary 4-bit counters 140 connected to count in synchronism with the clock signal on line 132. Address generator 89 repetitively counts from 0 to 1280, creating a sequentially ascending address on address bus 138, and continues counting up to 1408, at which time it produces an overflow signal on line 141, "Start of Scan". The 128 extra counts by address control circuit 89 provide time for the microprocessor 84 to take care of its housekeeping functions. A reset signal is produced on line 142 in response to a "Start of Scan" signal on line 14 sent to the microprocessor 84 at the start of each new scan of the array 57. The "Start of Scan" signal is sent from the counters 140, to ensure that the time between scans of any one of the sensors 64 is always the same. If the time is not the same, the charge integrated by the elements 64 will vary, even though the illumination is the same, thus defeating the benefits provided by the AGC system. Generating the "Start of Scan" from the counters, counting down the clock signal, ensures consistent timing. The microprocessor then is driven by the "Start of Scan" signal, and slaves all its operations to this signal. Reset logic 143 also produces a signal on line 149 which clears the contents of RAM 91, when a "Reset AGC" signal is received from microprocessor 84 at the beginning of the transverse scanning motion by arm 18 across board surface 10.

In alternative embodiments of the address control circuitry 89, the counters 140 are arranged to count downward and upward, as desired. To count downward, the number 1280 is loaded into the counters, and the counters are decremented through zero, all the way to −128 to provide the same amount of time for microprocessor 84 to perform its housekeeping functions. This bidirectional counter address control circuit 89 is particularly useful for electronic copy boards which do not use a memory 92 to temporarily store serial binary data from the photosensors 64 before sending this data to the printer 20. This features allows for ready bi-directional scanning. When the arm 18 scans the board surface 10 in one direction (such as from left to right), the array 57 is scanned from top to bottom by having address control circuit 89 count up from zero, and when the arm 18 scans the board surface 10 in the other direction (such as right to left), the array 57 can be scanned from bottom to top by having address control circuit 89 count from 1280 downward. In this manner, the serial binary data stream on line 93 is always loaded into the serial shift register buffer from the print head of printer 20 in the same direction, which avoids the problem of having a reversed image on the copy 22 produced by the printer.

The analog data successively produced by each of the PC boards 36 is sent over analog bus 126 and is received by solid state relay chip 144, which contains two independent relays (A and B) each having a normally open contact. Contact A is held closed for the fixed time period created by delay device 134 when signal 136 goes high. During this time period the amplified analog data signal on bus 126 is placed on charge holding capacitor 146. The amplified signal is preferably sampled by retaining the voltage across capacitor 146 at the moment contact A opens in response to signal 136 going low. This is achieved by selecting the gain and time constants of amplifier 100 and the size of capacitor 146 so as to allow the amplified signal level or voltage on bus 126 to reasonably faithfully reproduce the decaying portion of the unamplified analog signal from the addressed photosensor 64. Preferred component values for achieving this result in conjunction with with the tandem diode photosensors 64 of the type shown in FIGS. 6A–6C used in a 44 inch long array 57 having 1280 photosensors are indicated in FIGS. 10A and 11. As previously explained, the amplitude of the amplified signal on bus 126 is proportional to the total charge accumulated by the addressed photosensor 64 since the last time it was read. Accordingly, the sampled voltage held on capacitor 146 when contact A opens is proportional to, and provides a finely graduated indication of, the total accumulated charge that was present on photosensitive element 64 just before it is read (up to 16 or more levels of "gray scale"). This sampled or held voltage is preserved in an unchanging state while the further steps are carried out.

Following the aforementioned time delay, and upon receipt of a "Read Data" command on line 148 produced by read/write sequence logic circuit 147 in synchronism with the clock signal 132, the contents of the location of RAM 91 currently addressed on address bus 138 by address generator 89 are read onto eight parallel data lines 150. Next, the data on lines 150 are clocked into 8-bit latch 151 by the signal received over line 148. This parallel binary signal is converted to an analog signal by D/A converter 152, whose output is fed to operational amplifier 153, which is preferably configured as a current amplifier.

The output of operational amplifier 153 is presented via line 98 to a voltage divider leading to the negative input terminal of comparator 90 and to the negative input terminal of comparator 95 as shown in FIG. 11. The sampled or held voltage on capacitor 146 is presented via line 107 to the positive input of comparator 90 and the positive input of comparator 95. The front end of comparators 90 and 95 are preferably operational amplifiers 154 and 159 arranged in open loop configuration as shown. Due to the high gain of differential amplifier 154, the difference between the present value of the held signal on capacitor 146 and the previous peak value stored in the addressed location on RAM 91 and read from RAM 91, creates a binary signal on line 155 which is positive if the new value is greater than the old value. This signal is sent to flip-flop 156 whose output is sent to NAND gate 158 whose output is in turn connected by line 161 to RAM 91. The other signal input to NAND gate 158 through inverter 162 is the "Write enable" signal which is generated in synchronism with the clock signal by read/write logic 147. Upon receiving the "Write enable" signal, A/D converter 97 presents on lines 150 the digital value of the voltage held on capacitor 146. Receipt of a "Write" signal on line 161 by RAM 91 causes the RAM 91 to read and store the digital value on lines 150 produced by A/D converter 97. This digital value is stored in a eight bit byte location in RAM 91 whose address corresponds to that of the currently addressed photosensor 64. The foregoing sequence of signal transfers and comparisons ensures the storage, in digital form in RAM 91, of the signal level corresponding to the brightest image yet received by the currently addressed photosensor 64.

To the negative terminal of amplifier 159 is presented one of two voltage values which will depend upon the position of two position manual selector switch 164. When switch 164 is in the position opposite that shown in FIG. 11, a voltage which represents either a fixed threshold voltage expressed as a percentage of the supply voltage $V_{CC}$ determined by the setting of potentiometer 165 is presented. When switch 164 is in the position shown in FIG. 11, a voltage which is a fixed percentage (as determined by the setting of potentiometer 157) of the peak value stored in RAM 91 in the location corresponding to the currently addressed sensor is presented. This fixed percentage may be in the range of 50 to 90 percent and preferably is in the range of 60 to 80 percent. If the output of amplifier 159 is high, the analog voltage held on capacitor 146 is interpreted as a binary "one". If it is low it is interpreted as a binary "zero". This signal is sent to the D input of flip-flop 160, to produce a data signal on line 93 corresponding to the output of comparator 159. Binary data signals produced in this fashion are sent by line 93 to memory 92 (in FIG. 8) for further processing. If desired, the digital data signal produced can be complemented such as by selecting the complemented output of flip-flop 160.

The identities of typical components used in the circuits of FIGS. 9, 10 and 11 are given in the following table, it being understood that other similar or equivalent components could be substituted by one of skill in the art:

| Reference No. | Individual Part | Part No. |
| --- | --- | --- |
| 84 | Microprocessor | Intel 8031 |
| 100,153 | Operational Amplifier | Texas Instrument (TI) TL071 |
| 154,159 | Comparator | National Semiconductor Corp. (NSC)LM311 |
| 91 | RAM (2k byte) | Motorola 6116 |
| 92 | Memory | Texas Instruments DRAM TMS 4256 |
| 152 | D/A Converter | Motorola MC 1408 |
| 95 | Stepping Motor | Oriental Motors |
| 97 | A/D Converter | NSC ADC0802 |
| 104,102,112 | Decoder | Signetics 74HC138 |
| 108 | Analog Switch | Signetics 74HC4051 |
| 114 | Signal Buffer | Signetics 74HC14 |
| 120 | Analog Multiplexer | Signetics 74HC4051 |
| 130,156,160 | Flip-flop | NSC 74HC74 |
| 134 | Delay Device | NSC 74HC123 |
| 140 | 4-bit Up-Down Counters | NSC 74HC191 |
| 144 | Solid-State Relay | NSC CD4066 |
| 151 | 8-bit Latch | RCA 74HC374 |
| 158 | NAND Gate | NSC 74HC00 |

The remaining portions of the electronic copy board 11 which have not been described in detail above may be implemented using conventional circuits and components known to those in the art. Armed with the foregoing description, those skilled in the art could without undue experimentation, readily design, construct, and program the microprocessor-based controller 84, address control circuit 89 and memory control circuit 99 to perform in the manner described above. Accordingly, these details of the electronic white board 11 need no further description here.

In an alternate embodiment, all of the circuitry and functions performed by components on PC board 48 could be implemented with completely digital circuitry, using, for example, a single high speed data acquisition microprocessor chip with associated memory such as a suitably sized RAM. In such an embodiment, the analog signal on bus 126 would initially be converted to digital form. Thereafter, this digital value would be digitally compared with one or more stored digital values obtained from its RAM to obtain the same functional results achieved by analog comparator circuits 90 and 95 in FIG. 11. The output from such a chip may take a parallel data stream of a serial RS-232 data stream or of 8 bit words packed with bits representing the light/dark status of adjacent photosensors.

The preferred embodiments of the imaging system 15 and copy board 11 described above have been designed and constructed largely with discrete integrated circuit components. System 15 could be implemented, if desired, in a much more fully integrated fashion, for example, by using custom LSI chips to implement the circuit functions of PC boards 36 and 48, or by using thin film diodes and transistors formed on the same or discrete substrates by the same or similar deposition and processing steps used to create the thin film photosensors 64.

C1. MANUALLY MOVABLE IMAGING SYSTEM

Figures 12A, 12B:
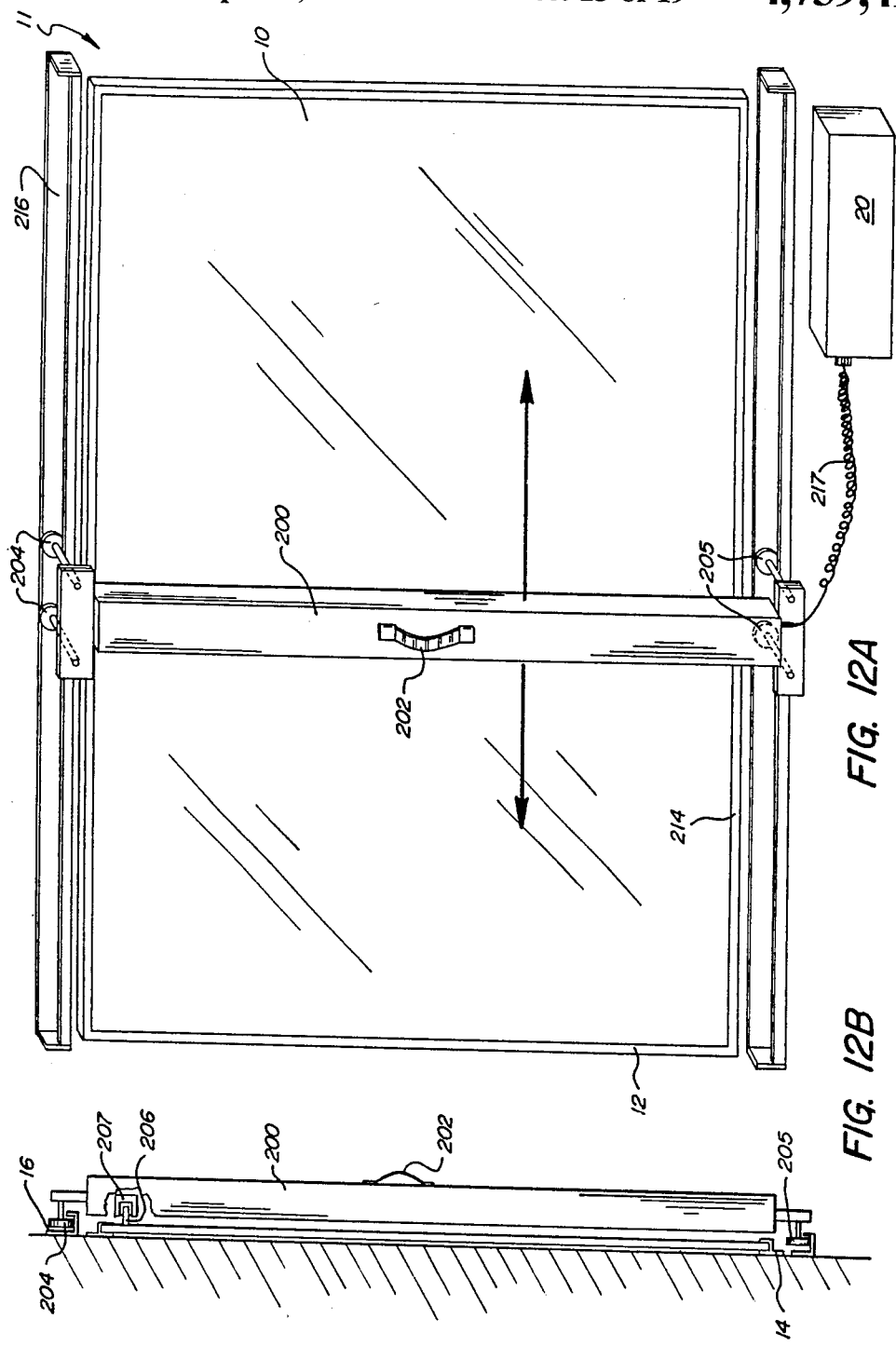
FIG. 12A is a perspective view of an alternative embodiment of an electronic copy board having the line imaging system of the instant invention mounted within a movable arm.
FIG. 12B is a side elevational view of the arm and board of FIG. 12A with a portion of the arm broken away to better show the rotary position or speed encoder used therein.

FIGS. 12A and 12B show a somewhat simplified perspective view of a less expensive version of the present imaging system used in an electronic copy board, as in FIG. 1. In this embodiment, a hand movable arm 200 has been substituted for the motorized arm 18 of FIG. 1. The arm 200 may be provided with an attached handle 202 which may be used to draw the arm 200 from one side of board 11 to the other. Arm 200 is supported in the vertical direction by two pairs of wheels 204 and 205, which hold the arm 200 in place vertically while allowing it to be readily moved horizontally. Upper wheels 204 ride in the channel or slot of a horizontal metal support member 216 which may have, for example, a U-shaped or J-shaped cross-section, positioned above board surface 10. Lower wheels 205 ride in the slot or channel of a similarly-shaped lower horizontal support member 214. Wheel 206 which is shown in FIG. 13B, making rolling contact with surface 10, is preferably attached to a conventional rotary position or speed encoder 207 to provide an indication of the relative horizontal position and/or speed with which the arm 200 is drawn over surface 10. In a manner which will be well understood by those skilled in the art, the horziontal position and/or speed indication provided by the encoder 207 can be used to generate the timing and sychronization signals necessary to produce copies of the scanned data.

The arm 200 is preferably moved across the board surface 10 at a steady rate which, depending upon the sensing rate of the linear sensor array within the arm and the associated electronics, may range from about 1 to about 10 inches per second (25 to 250 mm/sec.), or more. In a motorized arm, such as shown in FIGS. 1, 18, any desired steady rate of speed can be obtained by sending appropriate signals to stepper motor. In the illustrated embodiment a suitable, low cost mechanical speed governor device of the type known in the mechanical design arts may be provided within or as an attachment to arm 200 to provide a more uniform rate of speed as the arm is manually moved.

D. THE PRINTER AND RELATED CONTROLS

The electronic copy board 11 may further include a printer 20 which, when fed the appropriate signals originating from arm 18, produces a copy 22 of the original image 24 placed on surface 10. As shown in FIG. 1, the copy 22 is preferably a reproduction of the original image 24 which is substantially reduced in size. It has been found that low resolution line imagers, i.e., line imagers having a resolution of two photosensors or pixels per millimeter or less, are quite acceptable for such applications. Printer 20 can be any convenient form of printer, such as one using thermally sensitive paper. One suitable thermal printer for making reduced size copies is Model No. HZ-1X01-PM made by Sharp Electronics Co. Ltd. of Japan which prints a line, consisting of up to 1280 dots, on letter size paper (e.g., paper about 21.5 cm wide by about 27.8 cm to 35.5 cm long) at a horizontal resolution of six dots/mm and a vertical resolution of six lines/mm. Other types of printers such as dot matrix, ink jet or laser printers may be similarly employed.

The electrical connections between the arm 18, the electronic controller 84 and printer 20 shown in the bottom right hand corner of FIG. 1 may be provided in any suitable fashion, but are preferably made with conventional flat ribbon power and electronic cables (not shown) designed for flexing service and preferably with suitable strain-resistant electrical connections for at least the trolley end thereof. These cables are laid within and at least partially along the length of enclosed chamber defined by the framework of the copy board 11.

If desired, the data signals from arm 18 may be temporarily stored for later processing or printing, or may be printed concurrently with the scanning motion of the arm, as will be described later. Printer 20 may be located remotely from the copy board surface 10, provided suitable electrical interconnections are established between the arm and printer. The interconnections may take the form of a conventional, flexible, curled, multi-conductor electrical cable 217 with conventional connectors at the ends thereof as shown in FIG. 12A, an infra-red data link or the like.

E. THE STATIONARY SCANNING ARRAYS

Figure 13:
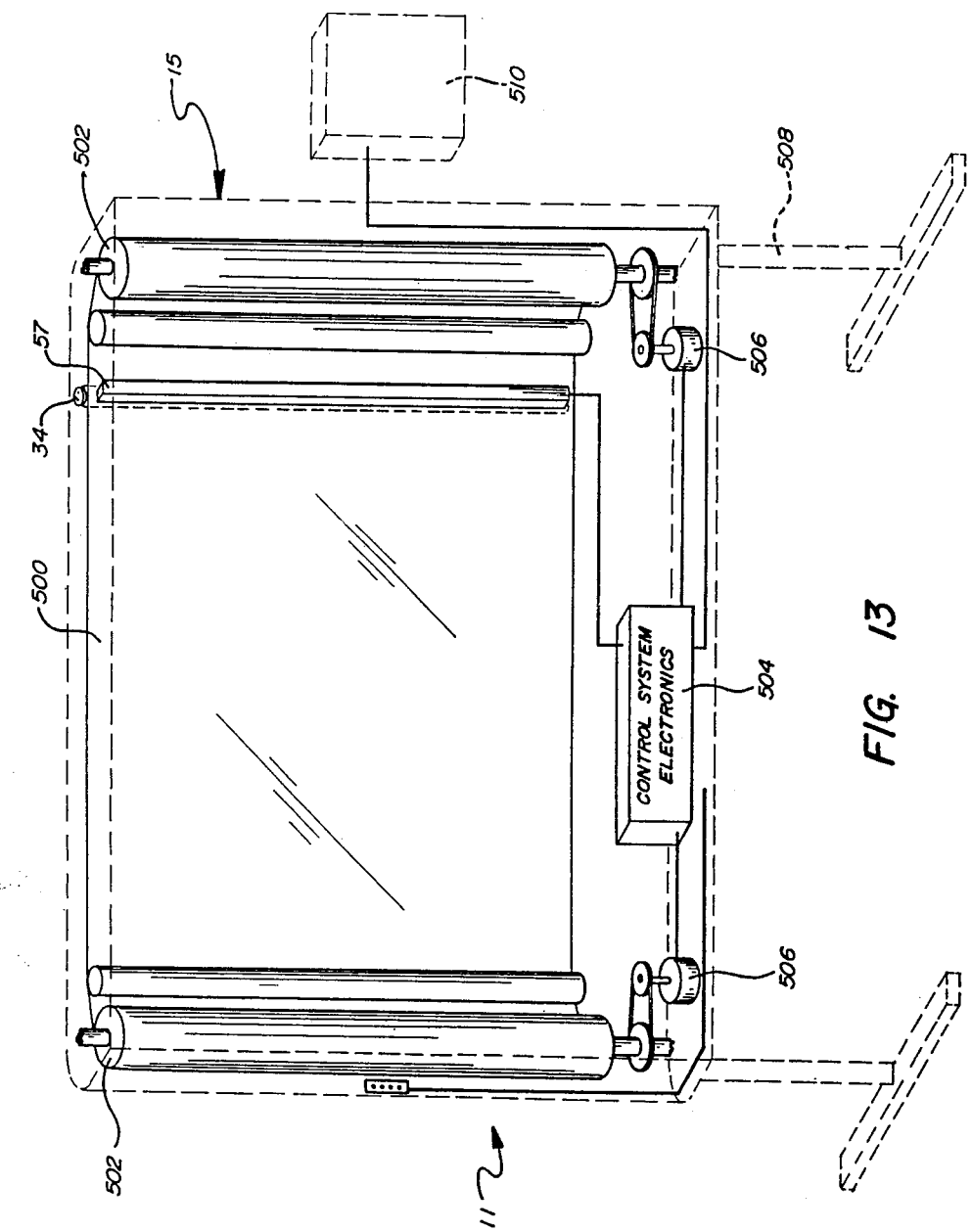
FIG. 13 is a broken-away perspective view of an alternative embodiment of an electronic copy board of the present invention utilizing a stationary line imaging array and a movable light-transmissive sheet a the image-bearing surface.

While the image scanning system of the instant invention has been described in terms of a copy board having a movable arm which traverses the surface thereof for the generation of signals indicative of the images thereupon, the instant invention is not limited in spirit or scope to a movable arm embodiment. As depicted in FIG. 13, a copy board may include an elongated movable sheet which is adapted to be scrolled or otherwise moved past the linear array of photosensitive elements for scanning of information thereupon.

Referring specifically to FIG. 13, there is shown a copy board 11 having a movable sheet such as a sheet of flexible, polymeric material 500, which is scrolled past a linear array 57, by a pair of motor driven rollers 502. The copy board of FIG. 13 further includes a light source 34 disposed so as to back light the sheet 500 and project the back lit image thereupon onto the linear array of photosensitive elements 57.

The light source 34 and the linear array 57 are generally similar in function and structure (except for the movement) to those described in the foregoing figures and need not be elaborated upon in detail herein; however, it should be noted that while the FIG. 13 embodiment depicts a back lit imaging mode, modification may be readily made to include front surface illumination as, for example, in the FIG. 1 embodiment. The FIG. 13 copy board 11 further includes control system electronics 504 generally similar in operation and structure to the electronics described for the foregoing embodiment, such electronics will be modified to include controls for the motors 506 which must cooperate to scroll the flexible sheet 500 past the scanner array 57. The copy board of FIG. 13 may optionally include a stand 508 and a printer 510 indicated here in phantom outline.

F. SCOPE OF DISCLOSURE

While the instant invention has primarily been described heretofore with reference to the scanning or imaging of a planar surface such as a copy board, the instant invention is not so limited. As mentioned previously, other planar and non-planar surfaces such as the planar contoured surfaces of textiles, newsprint, plywood and the like may be also scanned without departing from the spirit or scope of this invention. Scanning of the surface may be for purposes of reproducing the images or data found thereupon, or scanning of the surface may be for purposes of detecting flaws or irregularities in that surface. Therefore, in the broadest sense, the instant invention provides the electronic reproduction of various patterns of information or other indicia or features which are formed or otherwise detectable upon a surface to be scanned. This pattern may be compared with a stored pattern for later processing. For example, data corresponding to the pattern of textiles and the like may be stored in memory and compared with a pattern of data generated by scanning replications of those textiles so as to detect any flaws therein.

It is a notable feature of the instant invention that the arrays of photosensitive elements formed upon flexible substrates such as polymeric materials or thin metallic materials may be utilized to form flexible sensor arrays. Such flexible arrays may be readily utilized to scan non-planar, or other irregular surfaces as will be described in further detail hereinbelow. In light of the foregoing, it should be kept in mind that whenever "scanning" of surfaces is discussed herein, that term is meant to include the scanning of planar as well as non-planar and regularly shaped as well as irregularly shaped surfaces.

G. NON-RECTANGULARLY SHAPED SURFACES

The instant invention may be readily adapted for scanning non-rectangular or other irregularly shaped surfaces. In many instances, such as in the display of data on a radar screen, or the display of data in polar coordinate graphic form, or the display of data in circular (i.e., clock-type) charts; said data or other information is present in non-rectangular format. The principles of the subject imaging apparatus may be readily adapted for scanning such irregularly patterned information.

Figure 14A:
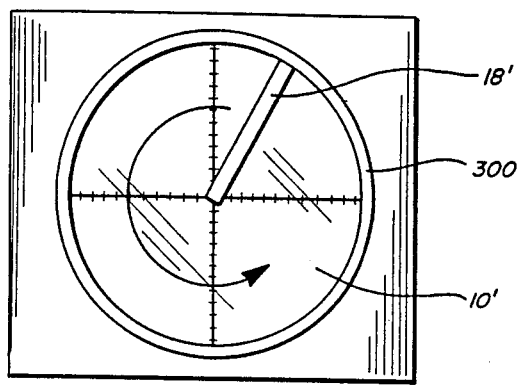
FIG. 14A is a front elevational view illustrating the linear imaging system of the subject invention operatively disposed on a rotating radial arm for scanning a circularly-shaped image-bearing surface.
Figure 14B:
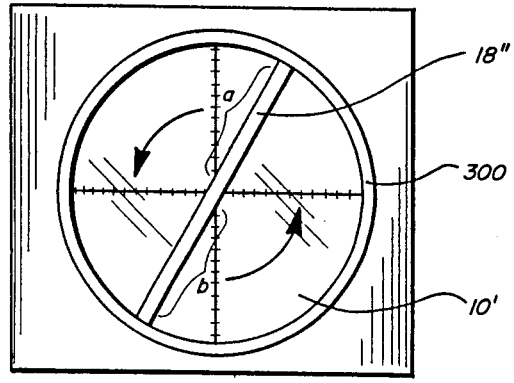
FIG. 14B is a front elevation view illustrating the circularly-shaped surface of FIG. 14A as adapted for scanning by a diametrical arm on which the linear imaging system of the subject invention is operatively disposed.

Referring now to FIGS. 14A and 14B, there are depicted embodiments of the instant invention as specifically adapted to scan a pattern of information disposed upon a circular surface, as for example a radar screen. In embodiments of this type, information from the radar screen may be stored, compared with previous data, transmitted to other locations for printing, or otherwise processed.

As depicted in FIG. 14A, a circular surface 10' has a scanning arm 18', generally similar in structure and function to the scanning arms 18 previously described with respect to rectangular surfaces, affixed in the center of the circular surface 10' and extending radially to the circumference of that circular surface 10'. The arm 18' may be affixed to the center of the surface 10' by a hinge, bearing, or other such rotary joint. The arm 18' is also affixed to a circular track 300 extending about the circumference of the circular surface 10'. The track 300 may be generally similar in structure and function (although not in shape) to the tracks described in the foregoing copy board embodiments and may, for example, include gearing or other drive surfaces to enable the arm 18 to rotate thereabout.

It should be apparent, although not shown, that the embodiment of the invention depicted in FIG. 14A, can generally include a printer, a control box, and electronic circuitry generally similar to that of the foregoing examples.

FIG. 14B depicts a different embodiment of the imaging system of the instant invention, as that system is adapted to scan the circular surface 10' of FIG. 14A. The FIG. 14B embodiment differs from the FIG. 14A embodiment in that the scanning arm 18" extends across the entire diameter of the circular surface 10' being scanned. Such an arrangement allows for more rapid scanning of the circular surface 10' since only a 180° revolution thereof would be necessary to scan the entire surface, vis-a-vis, the 360° revolution necessary with the radial arm 18' of FIG. 14A.

In some embodiments, the array of photosensitive elements of the diametric scanning arm 18" may be addressed as two separate groups so that data initially scanned by the first segment of the arm 18" denominated by the letter a is subsequently scanned by the second segment of the arm denominated by b. In this manner, rapidly changing data patterns, as for example on a high resolution radar scope may be quickly and continuously compared so as to detect small but significant changes.

The diametric arm 18" is held by, and rides in, a circumferential track 300, generally similar in structure and function to the track of the FIG. 14A embodiment. The arm 18" may include a single drive motor disposed at one end thereof and engaging the track 300" and an idler roller at the other end thereof also in engagement with the track. In other embodiments, the arm 18" may include two drive motors.

H. THE FLEXIBLE SUBSTRATE SCANNER AND THE SCANNING OF NON-PLANAR SURFACES AND SURFACE CONDITIONS

The fact that the scanning system of the instant invention may include photosensor arrays disposed upon flexible substrates greatly expands the utility and applications of the instant invention. Use of a flexible substrate photosensor array allows for conformal contact with a wide variety of differently shaped surfaces, including planar surfaces having irregular outlines as well as non-planar surfaces. FIGS. 15-17 depict several embodiments of the instant invention in which the flexibility of the photosensor array is utilized to provide for scanning of curved, irregular or other non-planar surfaces.

Referring now to FIG. 15, there is shown a flexible photosensor array 306 of the instant invention as adapted to scan the cylindrical interior surface of a pipe 308, as for example to inspect for flaws, corrosion and so forth. The scanner array of this embodiment 306, is disposed about the outer periphery of a mandrel 310 having a cross section approximately equal to that of the pipe 308 being inspected. The photosensor array 306, is generally similar to the previously described arrays, and the mandrel 310, is generally analagous to the previously described scanning arm and thus may include a light source and optical system therein as previously described for illuminating the surface of the pipe 308 being scanned. In those instances, where the pipe 308 is a transparent tube, such as a plastic or glass tube, a mandrel borne light source may not be needed, sufficient illumination being provided by passage of light therethrough in a back-lit mode of operation.

In operation, the mandrel 310 bearing the flexible, cylindrical photosensor 306 is advanced through the tube 308 by an arm 312, which can also serve to form a conduit for carrying electrical signals.

FIG. 16 depicts a flexible scanning array of the instant invention as adapted to scan an irregular surface such as automotive body panel 314, so as to detect flaws thereupon. In the embodiment of FIG. 17, a flexible photosensor array is disposed upon a substrate 316 which is generally conformable to the shape, in this case the body panel 314, being scanned. The substrate 316, may be a polymeric or metallic substrate. In some instances, it may be desirable to preform the substrate 316 to approximately correspond to the surface being scanned, whereas in instances where the contour is not to extreme, the substrate 316 and the scanner may be deformably contacted to the surface.

The photosensor elements and the associated electronics are generally similar to those previously described and will not be elaborated upon further except to note that when adapted for 2-D scanning, a plurality of linear sensor arrays may be disposed in side by side relationship, so as to allow for scanning without the need for relative motion of the sensor and surface. As illustrated in this embodiment, the substrate 316, bearing the photosensor elements thereupon is backed by a resilient body of material 318 such as, a body of foam rubber, polyurethane, or other such supple polymeric material. Additionally, in order to still further facilitate flexible contact of the photosensors to the irregularly shaped object being scanned, the resilient body 318 is backed with a mounting plate 320, affixed to a rigid surface 324 by a plurality of springs 322, rubber blocks or other such coupling members. Although not shown, the photosensors of the embodiment of FIG. 17 may include a wear resistant sheet, such as a sheet of teflon or other such lubricious material disposed thereupon so as to prevent abrasive damage to either the sensors or the surface being scanned. In order to still further minimize wear of the scanner and abrasive damage to the surface being scanned, it may be desirable to space the scanner from the surface. Such spacing may be accomplished by the use of air bearings, mechanic bearings or rollers as previously described, or by another technique known to those of kill in the art. Additionally, when such a spaced apart arrangement is employed, introduction of illumination is facilitated.

In operation, the scanner surface and the object being inspected are moved relative to one another. Typically, the objects, such as the body panel 314 will be moved past the scanner surface at an inspection station, and the flexible photosensor scanner array will produce an electronic signal corresponding to the surface being scanned. This signal may be utilized to indicate the presence of defects thereupon, and through the use of the appropriate software and apparatus, defective parts may be removed from the production line or defect curing procedures may be implemented to remove particular flaws. It is notable that the scanning array of the instant invention not only identifies defective parts but is capable of giving a positional location of the defects so as to enable the ready cure thereof.

The FIG. 17 embodiment of the instant invention utilizes the ability of flexible photosensor arrays of the instant invention to scan a curved surface. Shown in FIG. 17 is an inspection system as particularly adapted for scanning data or patterns upon a spherical surface, in this case the surface of an earth globe. Such scanning may be utilized in a production line to inspect the globes for defects. Alternatively, the system may be used to make two dimensional depictions of a spherical surface. Obviously, an embodiment of this type may also be utilized to inspect other spherical objects.

As depicted, the globe 326 is disposed in close proximity to a curved scanning arm 328, which is generally similar to the scanning arm 18, of the foregoing description. The curved arm 328 includes a curved array of photosensor elements, and may optionally include a light source. In operation, the globe 326, and the arm 328 are moved negative to one another, by either rotating the globe 326, the arm 328 or both. In this manner, scanning is accomplished as in the previously described embodiments. Obviously, other configurations of the scanning arm 328 may be utilized to take advantage of the flexibility of the photosensitive elements. For example, the array may be formed as a strip in a spherical on hemispherical cavity and the globe 326 may be rotated therein for scanning. Other such variations should be readily apparent to one of skill in the art.

I. LINE IMAGER KIT

While the imagers of the instant invention have been described with reference to complete, dedicated systems; the principles of this invention are similarly adaptable to the manufacture of line imager kits. Such kits may be utilized to scan data or other information on any pre-existing image bearing surface. For example, a chalkboard or markerboard may be retro-fitted with an imager kit so as to convert said boards to an electronic copyboard. Similarly, a drafting table may be equipped with a line imager kit to facilitate scanning of drawings. A typical drafting board installation will include a high resolution sensor array (e.g., 4–16 elements per millimeter), and would be useful for inputting graphic data into a computer aided design system. The imager kit can also be used to reproduce data from images projected on light colored walls or even television screens.

Figure 19:
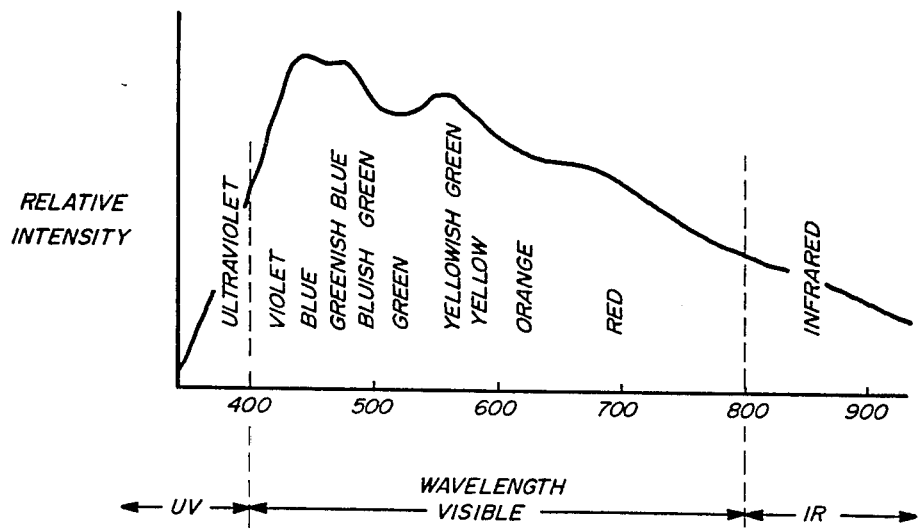
FIG. 19 is a plot having relative intensity plotted on the ordinate and wavelength on the abcissa, said plot illustrating the normalized intensity of wavelengths of the solar spectrum and including the colors formed by each region of wavelengths.

Referring now to FIG. 19, the line imager kit of the instant invention, is shown by reference numeral 600 in an exploded perspective view, illustrating the component parts thereof. While many configurations of the imaging kit 600 are possible within the scope of the present invention, the kit of FIG. 19 contains the component parts required to convert a pre-existing markerboard into an electronic copy board which is generally similar to that illustrated in FIGS. 12A and 12B. Accordingly, elements of the apparatus of the kit 600 which correspond to the copyboard elements will be referred to by like reference numerals.

The imager kit 600 is packaged in a carton 601, and includes a hand movable imaging arm 200; which, as described with reference to FIGS. 1 and 12 preferably includes a light source and an array of photosensitive elements. The imaging arm 200 includes an upper set of rollers 204, a lower set of rollers 205 and a handle 202 for moving the imaging arm 200. The kit 600 further includes one or more guide rails or support members 214 and 216 which are adapted to be mounted proximate the surface to be scanned by means of the screws 602 also provided in the carton 601.

The imager kit 600 also includes a control box 604 which contains the electronics and control panel for operating the imager. Included in the control box 604 are the start, stop and copy controls, as well as the interface to the printer (although a printer is not shown, it could also be contained within the carton). The kit 600 also includes a first cable 606 for connecting the arm 200 to the control box 604, and a second cable 608 for interconnecting the control box 604 to the printer. It is also within the scope of the instant invention to provide a motorized system for moving the arm 200 across the surface to be scanned at a governed rate of speed.

In order to mount the kit, the guide rails 214 and 216 are affixed either directly to, or proximate the surface being scanned. The guide wheels 204 and 205 of the arm 200 are mounted in the rails 214 and 216 respectively; the arm 200 is electrically interconnected to the control box 604 by means of the cable 606, and the control box 604 is interconnected by the cable 608 to the printer or other display device. Operation of the thus completed board proceeds as in the FIGS. 12A and 12B embodiments.

Obviously, the composition of the kit as well as its component parts may be varied. For example, a motorized arm may be substituted for the manual arm. Likewise, the size or particular configuration of the arm may be varied in accord with the foregoing discussion, so as to provide a kit adapted to scan various objects and surfaces.

J. COLOR SENSITIVE SCANNING SYSTEMS

The photosensor arrays of the instant invention may be optimized in terms of color response so as to generate a signal therefrom indicative of the color as well as the shape of an informational pattern disposed upon a surface being scanned. Such a color responsive system will have many readily apparent uses. For example, such information may be conveyed to a color printer so as to produce full color reproductions of information on a marker board or the like. Also, a signal bearing color information may be processed so as to particularly accentuate the color portions thereof. For example, in a system optimized for the inspection of textile patterns, a color responsive scanner array may be utilized to scan particularly colored portions of the textiles so as to detect flaws resultant from excess, or inadequate amounts of a particular color. Likewise, a color responsive photosensor may be utilized to inspect metal sheets for rust by sensing the spectral signature of oxidized iron. These are but a few of the possibilities for such color sensitive photosensor arrays.

White light is composed of a plurality of wavelengths. Consequently, light reflected from an image on a light colored surface, such as a white surfaced marker board, inherently includes information in terms of the wavelength and intensity thereof. Referring now to FIG. 19, there is shown a graphic representation of "white" light, which in this case is the solar spectrum incident upon the surface of the earth. It will be noted from the Figure that broad band white illumination comprises a plurality of wavelengths extending from the ultra-violet to the infra-red and that within the visible portion of the spectrum are a plurality of wavelengths denominated by different colors. The human eye, itself, is most sensitive to the green to yellowish-green portion of the spectrum, said spectrum extending from approximately 525 to 575 nanometers. It would be desirable to have a scanning system which corresponds in sensitivity and response to the human eye so as to to scan and reproduce a full spectrum of information upon a surface and to be able to implement the various inspection methods discussed hereinabove.

In order to produce a signal having color information, the array of photosensitive elements must be tailored for particular sensitivity and response to selected wavelength regions of the spectrum. Such sensitivity may be achieved by utilizing photoresponsive alloys sensitive to different spectral regions, by utilizing photosensitive element configurations optimized for particular response, by utilizing filters adapted to either absorb or transmit specific wavelengths, or by various combinations of foregoing techniques.

It is known that by controlling the band gap of semiconductor alloy materials, the photoresponsive region thereof may be selected. For example, wide band gap semiconductors such as silicon-carbon alloy materials exhibit enhanced blue sensitivity whereas narrow band gap semiconductors such as silicon-germanium alloys and germanium alloys have enhanced red sensitivity. By the use of photosensitive elements made of specifically selected band gap materials, the spectral response of elements to the plurality of wavelengths may be achieved. Such band gap modification techniques are well known to those skilled in the art and are referred to more extensively hereinabove.

Through the use of appropriate configurations of the photosensitive elements, the photoresponse thereof to various portions of the spectrum may also be controlled. In the typical photoresponsive element described herein, such as a photodiode or the like, a body of photoresponsive semiconductor alloy material is disposed between two conductive electrodes, at least one of which is typically fabricated from a transparent conductive material such as ITO or the like. It is known for those skilled in the art that by the particular control of the refractive index and thickness of a layer of transparent material, such as the transparent conductive oxide material, the reflective and anti-reflective response of the material to various wavelengths of light may be controlled (through the phenomenon of constructive and destructive interference). Through the use of the appropriate thicknesses of layers, and in some instances through the use of multilayered coatings, interference conditions may be selected so as to permit transmission therethrough of only particular portions of the spectrum. This phenomenon is commercially exploited at present in the manufacture of what are known as "interference filters". It will be appreciated by those skilled in the art, that through the control of the thickness, composition, and numbers of layers of transparent conductive oxide material, the transmission of light to the photosensitive elements may be readily controlled. Still further control of the spectral-photoresponse of the elements may be obtained by utilizing multilayered bodies of semiconductor alloy material.

Figure 20:
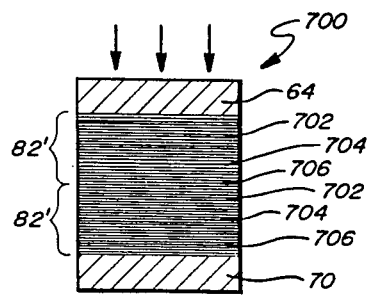
FIG. 20 is a fragmentary, cross-sectional view of a tandem photodiode illustrating the alternately repeating layers from which the photogenerative region thereof may be formed.

Referring now to FIG. 20, there is shown a cross-sectional view of a portion of a photosensitive element 700, configured as a tandem photodiode structure generally similar in function and structure to the tandem photodiode of FIG. 6B; accordingly, similar components thereof will be referred to by similar reference numerals. The diode 700 of FIG. 20 includes a substrate 70 and atop transparent conductive oxide layer 64, generally similar in function and structure to those previously described. The photodiode 700 is comprised of two stacked diode structures 82'. Where the diodes 82' differ from those previously disclosed is in that they are comprised of a plurality of very thin sub-layers. Each of the photodiodes 82' includes a p-type conductivity region 702, an intrinsic region 704, and an n-type conductivity region 706, each of said regions formed of a plurality of thin layers as indicated. By controlling the thickness of these thin layers, the spectral response of the device may be tailored. Various other device configurations may be fabricated by combining these device design principles. For example, through the use of a precisely controlled transparent conductive oxide layer 64 in conjunction with properly selected thin layers of p-i-n material, the spectral response may be further selected. In other instances, the two photodiodes 82' of the tandem structure 700 may be separated by the interposition of an additional layer of transparent conductive oxide material therebetween. By appropriately selecting thicknesses of all these layers, the optical transmission of given wavelengths of light may be further controlled.

Through the use of the appropriate optical filters, the photoresponse of various of the photosensitive elements of an array may also be controlled. By providing an optical filtering element such as a glass or gel sheet atop the photosensitive element, it is possible to control the wavelengths of light reaching the photoresponsive region thereof. In this manner, the wavelengths which the element "sees" may be readily controlled. Through the use of the appropriate electronic circuitry, the signal generated by variously filtered photosensitive elements may be balanced so that equal the response thereof to equal intensities of various wavelengths of light may be produced. Such color filtering and color balancing techniques are widely known and available to those skilled in the art insofar as they are utilized in both silver halide and electronic photography.

In order to effect a full color scan of an image on an image-bearing surface, that surface must be read by a large number of the small area photosensitive elements which are aligned to form an array, each responsive to a different portion of the spectrum. It has generally been found that for best color reproduction three separate color signals should be utilized, corresponding generally to the red, green, and blue portions of the spectrum; however, it has been demonstrated that full color may be reproduced utilizing fewer than three spectral bands.

In order to accomplish full color scanning, various photosensor arrays may be employed in accord with the principles of the instant invention. For example, a linear array of repetitive red, blue, and green sensitive elements disposed in side-by-side relationship may be utilized. In arrays of this type a picture unit will consist of a red, green, and blue portion in side-by-side relationship; therefore, the physical size of each photosensitive element should be made somewhat smaller than the elements utilized for non-color scanner, so as to assure high resolution. In another embodiment of color scanner, three separate arrays disposed in parallel relationship may be utilized. In this arrangement, the scanning arm includes three strips of photosensitive elements mounted so as to sequentially read the image. Each of the strips is responsive to a different portion of the spectrum and the three signals are electronically combined to produce a full color output signal.

This particular arrangement allows for ease of fabrication insofar as all the photosensitive elements within a given array will be identical in composition and/or configuration. For example, all of the elements within a first one of the arrays may be made of a wide band gap material so as to have high blue sensitivity or alternatively, all of the elements within the given array will have TCO layers optimized to give sensitivity to a particular spectral band. In instances where filter elements are being utilized to give appropriate spectral sensitivity, such filters may be applied in elongated strips across the entirety of the arrays as, for example by affixing a gelatin strip, or screen printing a gelatin paste across the elements.

It will generally be desirable to approximate the sensitivity of the human eye with the spectral response of the full color photosensor array so as to allow for accurate reproduction of perceived colors. The human eye is most sensitive to the yellowish green spectral regions, and the response of the full color photosensor array may be enhanced in this region by either including a greater number of green sensitive elements therein or by electronically amplifying the contribution of the green elements so as to balance the color.

The processing of the signals from the red, blue and green sensors will be analogous to signal processing for the non-color sensitive embodiments described previously. Each color responsive element will produce its own signal indicative of the image upon a particular portion of the surface and as perceived in a particular region of the spectrum. This signal will be processed so as to provide an output signal which may for example, be sent to a printer or other terminal device. Additionally, automatic gain control circuitry generally similar to that previously described may be included in the full color scanner.

Figure 21:
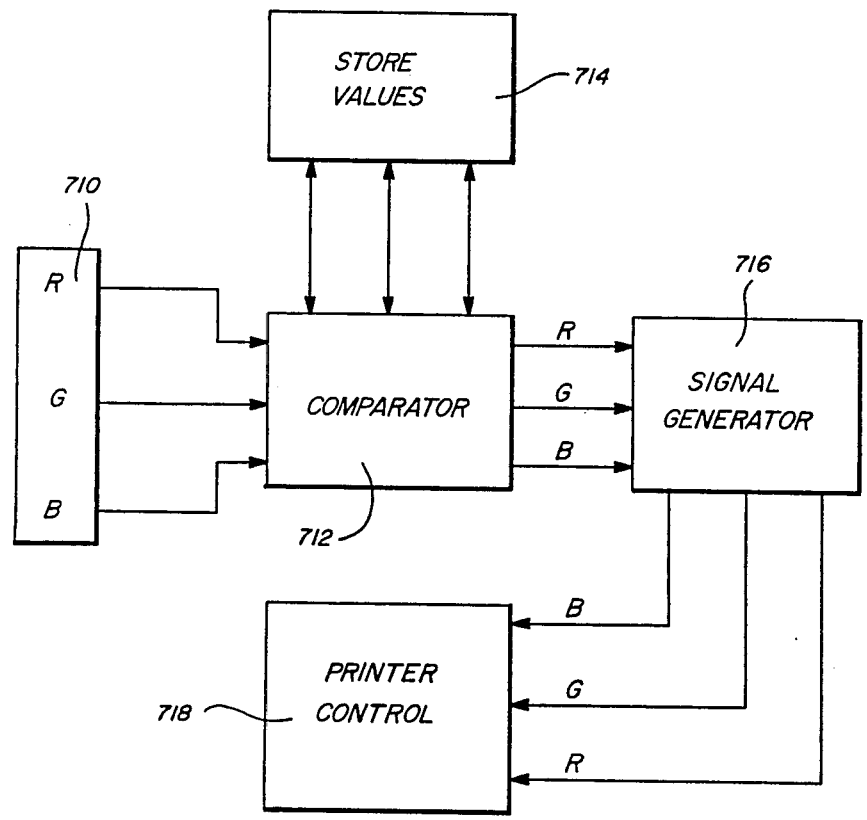
FIG. 21 is a block diagram representing the manner in which color signals photogenerated by the photosensitive elements are processed in order to replicate the color of images on an image bearing surface.

Referring now to FIG. 21, there is shown a simplified block diagram illustrating processing of a multi-colored signal. A group of red, green and blue photosensitive elements 710, produces three distinct signals which are conveyed to a comparator circuit 720 which, as the previously described automatic gain control compares those signal values with values stored in a memory 714, said values indicative of highest sensed signals for each particular color. In the comparator 712, the red signal from a given element is compared with previously stored red values for that or a comparable element; the green signal is compared with previously stored green values and the blue signal with previously stored blue values. Based upon this comparison, the signal generator 716 generates a signal indicating whether a particular photosensitive element is sensing a blank or image-bearing portion of the surface being scanned.

The signal from the signal generator 716 may be utilized as previously discussed. For example, the signal may be conveyed to a printer control 718 which energizes a color printer so as to provide a hard copy of the image being scanned. The exact functioning of the circuitry will be similar to that previously described and need not be elaborated further herein, although it should be mentioned that processing of the three colored signals may be either accomplished serially or in parallel. In serial operation, a time multiplexing scheme may be utilized to alternately sample the data stream from the red, green and blue photosensitive elements. In this manner, the three signals will time-share the comparator 712 and signal generator circuitry 716. In a parallel operation, additional electronic circuitry will be needed to allow for simultaneous processing of the three signals. All of such variations are within the skill of those in the art.

In one particular embodiment of the instant invention, as optimized for use with a marker board or the like, special markers may be utilized to enhance the operation of the system. Such markers will include therein a chromophoric material such as a dye, or pigment whose spectral signature is matched to the photoresponse of particular group of color sensitive elements. In this manner, each color sensitive group of elements will sense and respond to presence or absence of that chromophoric material and will accurately generate a signal having color-bearing information. In the simplest embodiment, for example a red marker adapted for use as for example with a white board, will have therein a red dye having spectral transmission or reflectance characteristics closely matched to the photosensitivity of the red photosensitive elements. Similarly, the green and blue markers will have particular chromophoric materials therein. In this manner the reproduction of the red, blue and green colors will be very true.

It should be kept in mind that the photosensitive elements may be made to "see" or sense colors not seen by the human eye. For example, the markers may include therein chromophoric materials not having colors readily perceivable by the human eye, but perceivable by the elements. Such "invisible" colors may be utilized as markers to key photosensors to particular values. For example, a red marker including therein a dye manifesting a red color as perceived by the human eye, may also include a chromophoric material having a particular signature in the visible, infra-red or ultra-violet portions of the spectrum. The "red sensitive" photosensitive elements may then have their photoresponse adjusted so as to "see" only this dye and produce a signal indicative of the color red upon the sensing thereof. There are a wide variety of materials which have particular absorption or emissions signatures in the visible ultra-violet and infra-red portions of the spectrum. For example, many material fluoresce when illuminated with ultraviolet radiation. Such materials may be included in the markers and the illumination system of the instant invention may be modified to include a light source having wavelengths capable of activating these fluorescent materials.

By utilizing such an "invisible color" system, the reliability of color scanning may be enhanced. Whereas a mark on a marker board perceived by the human eye as being green, blue or red represents a relatively broad portion of the spectrum, a photosensitive element sensing the "invisible" chromophoric material will be receiving a very pure and strong signal. The use of such markers will also allow for security of the copy system insofar as the system will only be responsive to particular markers.

In a further refinement of the system, the signal produced thereby may be fed to a color printer in which the inks thereof also include the particular "invisible" chromophoric materials. In this manner, only copies made on the authorized copy board may be sensed and reproduced by particular scanners. Such embodiment of the instant invention allows for control of use of equipment and copies made therefrom.

While the particular embodiments of color scanners have been described with particular reference to white board scanners and including photodiode elements therein, obviously any of the previously discussed embodiments and variations of the instant invention may be utilized in a color scanning mode.

It should additionally be noted that when the image-bearing surface is light-emitting, (e.g. when it is back lit, or when it is a cathode ray tube, light emitting diode array on liquid crystal display device or the like) all optical elements may be dispensed with, and the array may be placed in direct context therewith. Light, in this instance, will pass directly from the image-bearing surface to the individual elements. In some instances it may be desirable to interpose a thin, light transmissive member between the sensor elements and the surface to prevent damage by abrasion and/or ambient conditions.

Many variations of the foregoing embodiments of the instant invention should be readily apparent to one of skill in the art. A great variety of scanner devices may be manufactured in light of the fact that photosensor arrays having preselected spectral responses and gray scale responses may be formed upon a variety of substrates. Through the use of appropriate photosensitive materials and device configurations, sensors having gray scale and color reproduction capabilities can be provided. The electronic circuitry disclosed herein will also find utility in a variety of imaging, as well as other electronic applications.

While specific preferred embodiments of the present invention have been described in detail, it will be appreciated that the invention is susceptible to modification, variation and change without departing from the spirit or scope of the present invention, which is to be limited only by the following claims.

We claim:

1. Apparatus for detecting an image comprising:
    a frame including first and second spaced apart frame portions;
    a flexible, elongated, image-bearing sheet of generally rectilinearly shaped material extending between said frame portions; said sheet having an image-bearing surface defined by a length dimension and a width dimension;
    an elongated first roller having one end of said sheet connected thereto and rotatably mounted on said first frame portion for dispensing therefrom or receiving thereabout said sheet of material;
    an elongated second roller rotatably mounted on said second frame portion and having the end of said sheet opposite said one end connected thereto for dispensing therefrom and receiving thereabout said sheet of material;
    said image-bearing sheet adapted to move along a substantially linear direction of travel between said first roller and second roller;
    a linear array of at least 200 thin film photosensitive elements mounted between said frame portions and extending transversely relative to the direction of linear movement of said sheet between said rollers, said linear array extending across essentially the entire width dimension of and disposed in close proximity to one side of said sheet; each of said photosensitive elements including at least one thin film layer of silicon or germanium alloy material operable to convert light energy emanating from a portion of the image-bearing surface of said sheet and incident upon said photosensitive elements into an electrical signal, said signal corresponding to light energy emanating from said portion of said image-bearing surface over a predetermined time period; and
    elongated light means mounted adjacent said linear array for illuminating portions of said image-bearing surface of said sheet.

2. Apparatus as in claim 1, wherein said sheet is light-transmissive, and said linear array and said light source are disposed on opposite sides of said sheet.

3. Apparatus as in claim 1, including a rigid planar surface secured to said frame and operatively disposed in direct contact with one face of said sheet for preventing substantial deformation of said sheet when said sheet is contacted by a marker used to form an image thereon.

4. Apparatus as in claim 1, further including rotating means comprising a pair of motors and a pair of drive systems for drivingly connecting said motors with said rollers.

5. Apparatus as in claim 1, including means for limiting the light energy impinging on said photosensitive elements to substantially that light energy which emanates from the corresponding surface portions of said sheet.

6. Apparatus as in claim 5, wherein said limiting means is a printed circuit board having a linear array of apertures therethrough, said apertures aligned with respective ones of said photosensitive elements, and wherein said linear array is mounted on said printed circuit board.

7. Apparatus as in claim 6, wherein said printed circuit board includes a surface contacting portion surrounding said apertures and adapted to slidably contact said sheet as said sheet moves past said linear array.

8. Apparatus as in claim 1, wherein said linear array of photosensitive elements is formed from at least three layers of amorphous silicon alloy material of differing conductivity types arranged in a PIN diode structure with a superjacent transparent conductive layer; and at least said conductive layer patterned to define the size and configuration of said photosensitive elements.

9. Apparatus as in claim 1, further including an elongated, linear, non-inverting imaging lens array comprising a plurality of aligned lenslets, said lenslets having an optical axis operatively disposed perpendicular to said image-bearing surface.

10. Apparatus as in claim 9, wherein each of said lenslets provides substantially a one-to-one magnification ratio.

* * * * *